United States Patent [19]

Henderson et al.

[11] Patent Number: 4,683,636

[45] Date of Patent: Aug. 4, 1987

[54] WIRE PREPARATION SYSTEM

[75] Inventors: James A. Henderson, Finksburg; Constantine M. Travlos, Baltimore; David S. Ferris, Annapolis, all of Md.; Gerald J. Duddy, Thousand Oaks; Roland F. Mercier, Los Angeles, both of Calif.

[73] Assignee: Westinghouse Electric Corp., Pittsburgh, Pa.

[21] Appl. No.: 670,695

[22] Filed: Nov. 13, 1984

[51] Int. Cl.[4] .............................................. B23P 23/00

[52] U.S. Cl. .................................... 29/564.6; 140/140

[58] Field of Search ............... 140/139, 140; 29/564.6; 83/580

[56] References Cited

U.S. PATENT DOCUMENTS

| | | | |
|---|---|---|---|
| 3,231,970 | 2/1966 | Wardell | 29/564.6 |
| 3,479,717 | 11/1969 | Howard | 29/564.6 |
| 3,693,228 | 9/1972 | Logan . | |
| 3,930,524 | 1/1976 | Tarbox . | |
| 3,947,943 | 4/1976 | Kokubo et al. . | |
| 4,030,527 | 6/1977 | Roch- . | |
| 4,107,838 | 8/1978 | Keen et al. . | |
| 4,114,014 | 9/1978 | Shogo et al. . | |
| 4,190,890 | 2/1980 | Marx . | |
| 4,348,805 | 9/1982 | Gibbons . | |
| 4,360,962 | 11/1982 | Suzuki et al. . | |
| 4,370,786 | 2/1983 | Butler | 29/564.6 |

*Primary Examiner*—Lowell A. Larson

*Attorney, Agent, or Firm*—W. G. Sutcliff

[57] ABSTRACT

A system for accepting conventional wire in bulk form, cutting the wire into predetermined lengths and preparing the ends of the wire for use in conventional wire harnesses is disclosed. More specifically, the system accepts as input data, in digital form, which fully describes each wire to be formed. Individual wires having the required length are cut from wire provided in bulk form. As each section of wire is measured and cut, it is stored in individual containers and the ends of each section is secured by a clamp. A transport system sequentially transports the stored wires to workstations where conventional wire preparation tasks such as stripping, marking and attachment of terminals are performed. After all wire preparation functions have been performed, the individual wires are removed from their containers and utilized in forming wire harnesses.

2 Claims, 31 Drawing Figures

FIG. 16
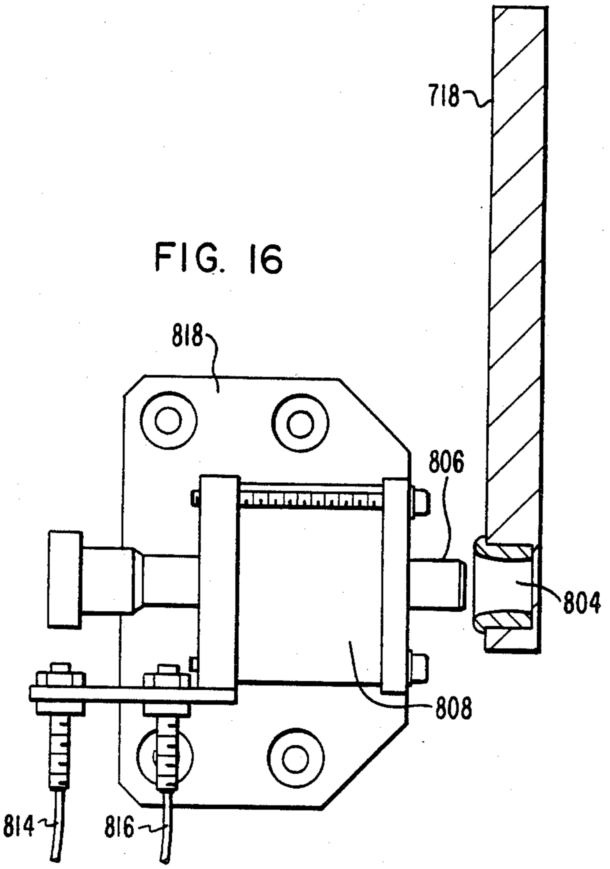
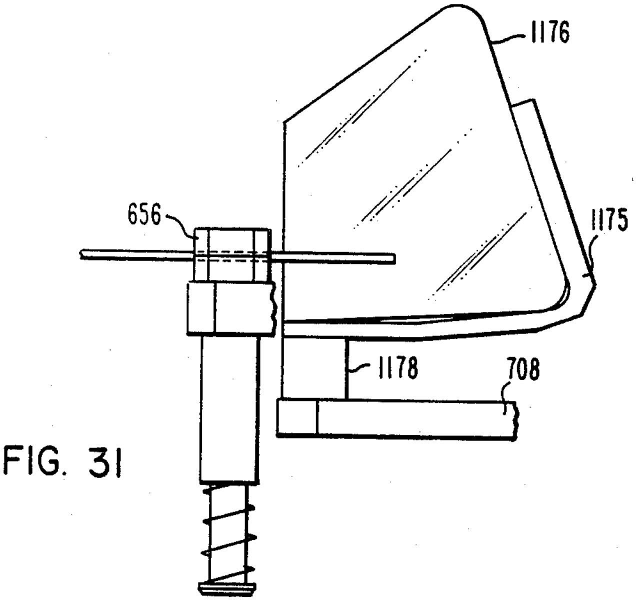
FIG. 31

WIRE PREPARATION SYSTEM

BACKGROUND OF THE INVENTION

1. Field of the Invention

The invention relates to manufacturing apparatus and more specifically to automated apparatus for preparing wires for use in wiring harnesses.

2. Description of the Prior Art

Prior art methods of preparing wires for use in wiring harnesses have required considerable manual operation. For example, it is usual to measure and cut the wires into the required length manually. After the individual wires are cut to the proper length, the ends of the wires were manually presented to wire preparation apparatus, such as lay crimpers and strippers, for performance of wire preparation operations. After all wire preparation operations are completed, the individual wires were transferred to the harness preparation area for harness assembly.

SUMMARY OF THE INVENTION

The invention comprise apparatus and methods for automatically preparing sections of wire for uses as electrical interconnections. Data, preferably in digital format, is inputted to the system to completely specify each wire to be processed. In response to this data, the system removes wires from bulk storage and cuts the wire into the desired lengths. As each section (length) of wire is cut it is stored in a container and the ends of the wire are acquired by wire clamps forming a portion of a wire transport pallet. A transport system sequentially transports the individual wire transport pallets to workstations. The wire is automatically presented to the workstations to be utilized in preparing a wire. At the completion of each wire preparation operation the transport system is indexed to move the wire to the next station. After all wire preparation task have been performed on a wire, it is automatically removed and transferred to the harness assembly operation.

DESCRIPTION OF THE DRAWINGS

FIG. 16 is a top view illustrating the horizontal indexing pin;

FIG. 31 is a side view of the wire container;

DESCRIPTION OF WIRE PREPARATION SYSTEM

Figure 1:
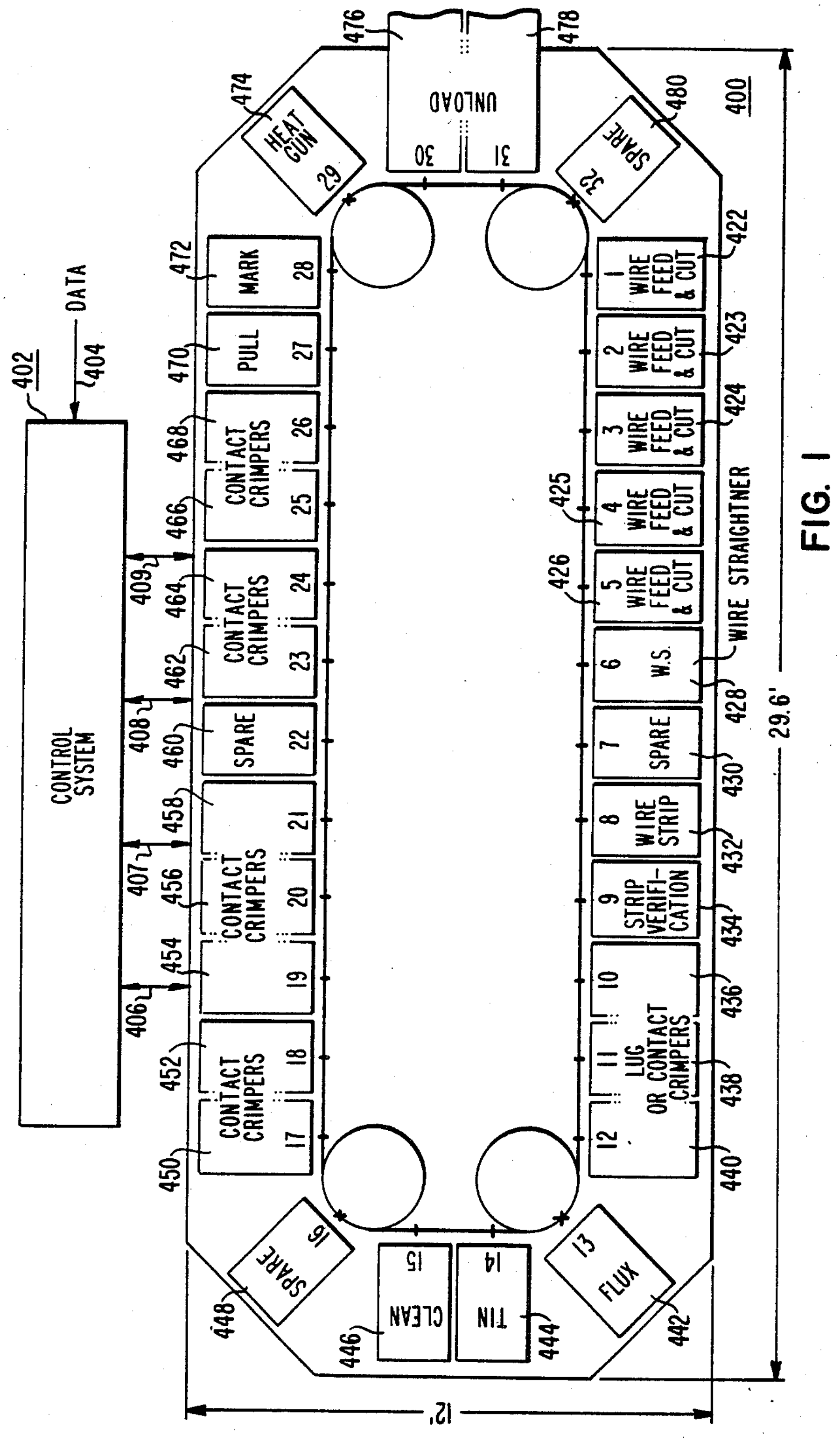
FIG. 1 is a somewhat schematic top view of apparatus comprising the invention.
Figure 2:
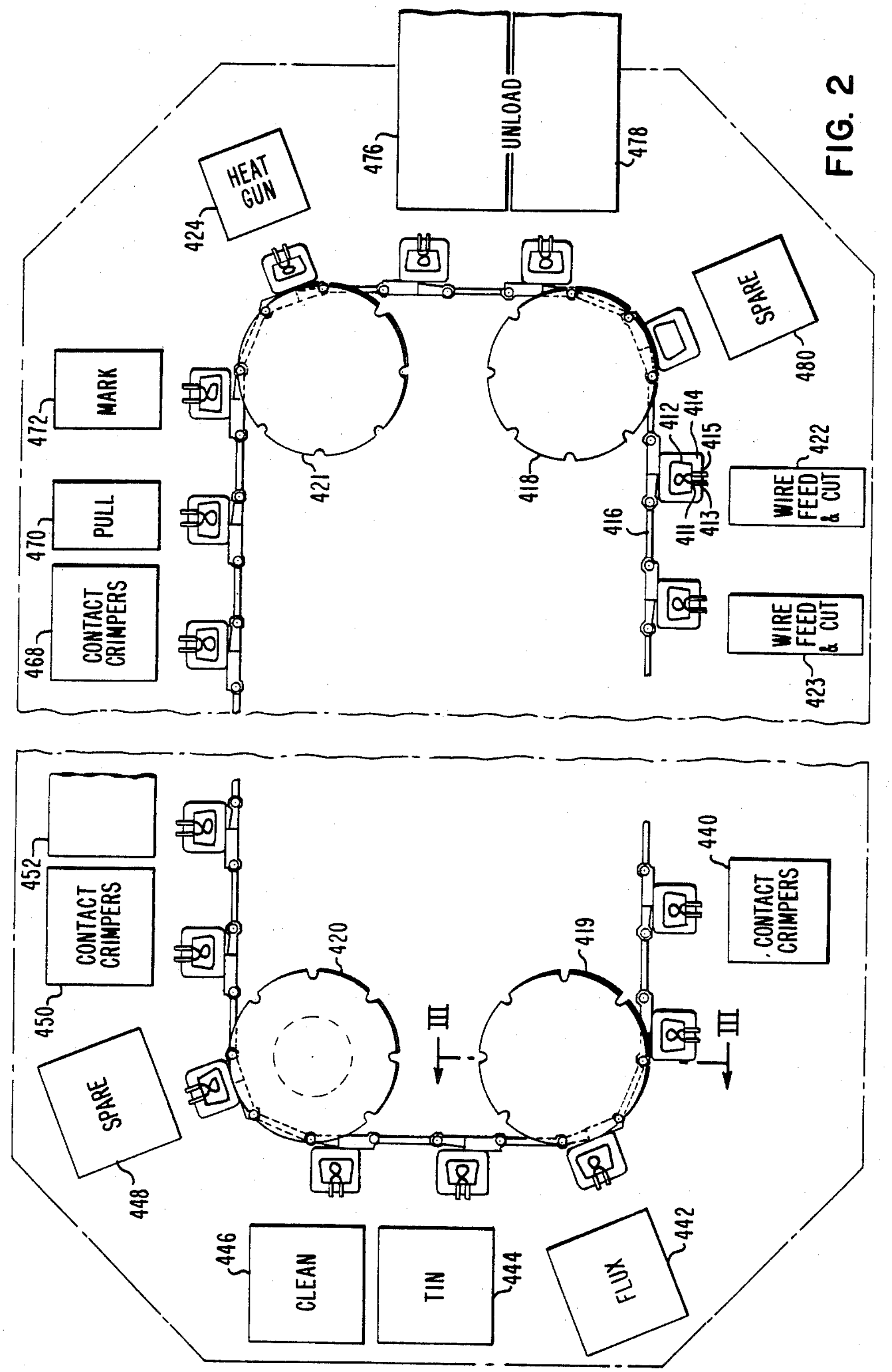
FIG. 2 is a top view of the apparatus comprising the invention showing more detail of the transport apparatus.

The wire preparation system 400 of the present invention is seen schematically in FIGS. 1 and 2, along with control system 402. Manufacturing data regarding the wires to be prepared, in batch fashion or in sequence for forming a kit for a cable harness, is fed on line 404 to the control system 402 which is operatively connected to the wire preparation system 400. The control system can be a plurality of microprocessors or a general purpose computing means, which provides control signals along lines 406–409 for controlling and actuating the wire preparation system and the individual workstations that form it.

The purpose of the wire preparation system is to cut wire of selected diameter to a predetermined length, and thereafter, advance the wire along the system to the various workstations, and prepare the wire with selected electrical terminations and with indentification markings thereon. The prepared wires are then ready for cable harness fabrication.

The initial workstation is depicted at the lower right corner of FIGS. 1 and 2, with the wire preparation system having a generally rectangular layout with the sequential workstations spaced about the periphery. The generally rectangular central work area includes a workpiece table 410.

The wire preparation system functions in the following way; the cut to length wire 411 (FIG. 2) is placed into a wire container 412 which is in turn mounted on a transport pallet 414 which is advancable around the central work area by means of an endless chain means 416 and plural sprocket 418, 419, 420 and 421. The wire transport pallet is advanced from workstation to workstation disposed about the central work area, and a specific wire preparation operation is performed at each workstation, with a pallet for each workstation. In the embodiment of FIG. 1, 32 workstations are shown.

Figure 3:
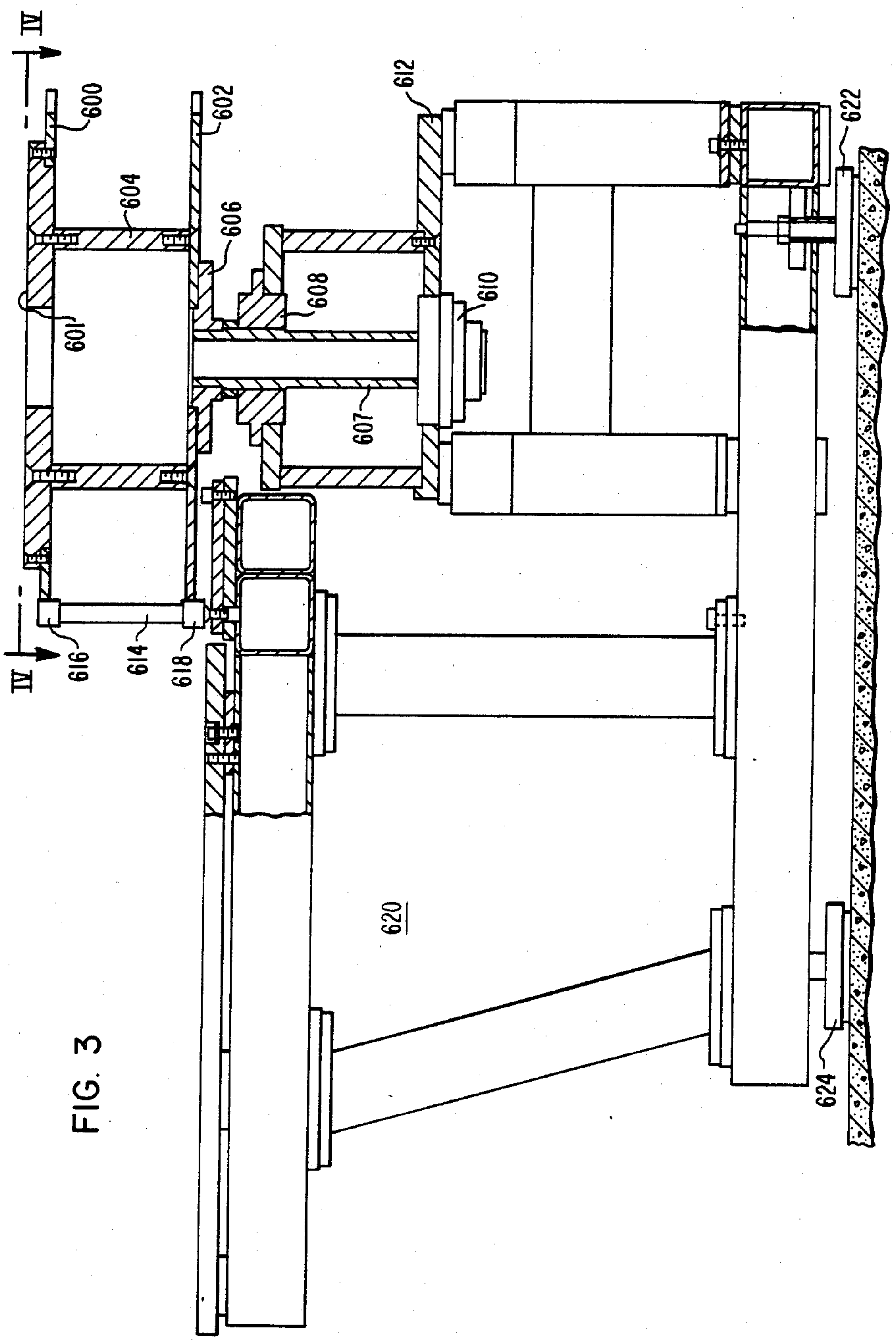
FIG. 3 is a cross-section of the sprockets supporting and driving the transport chain.
Figure 4:
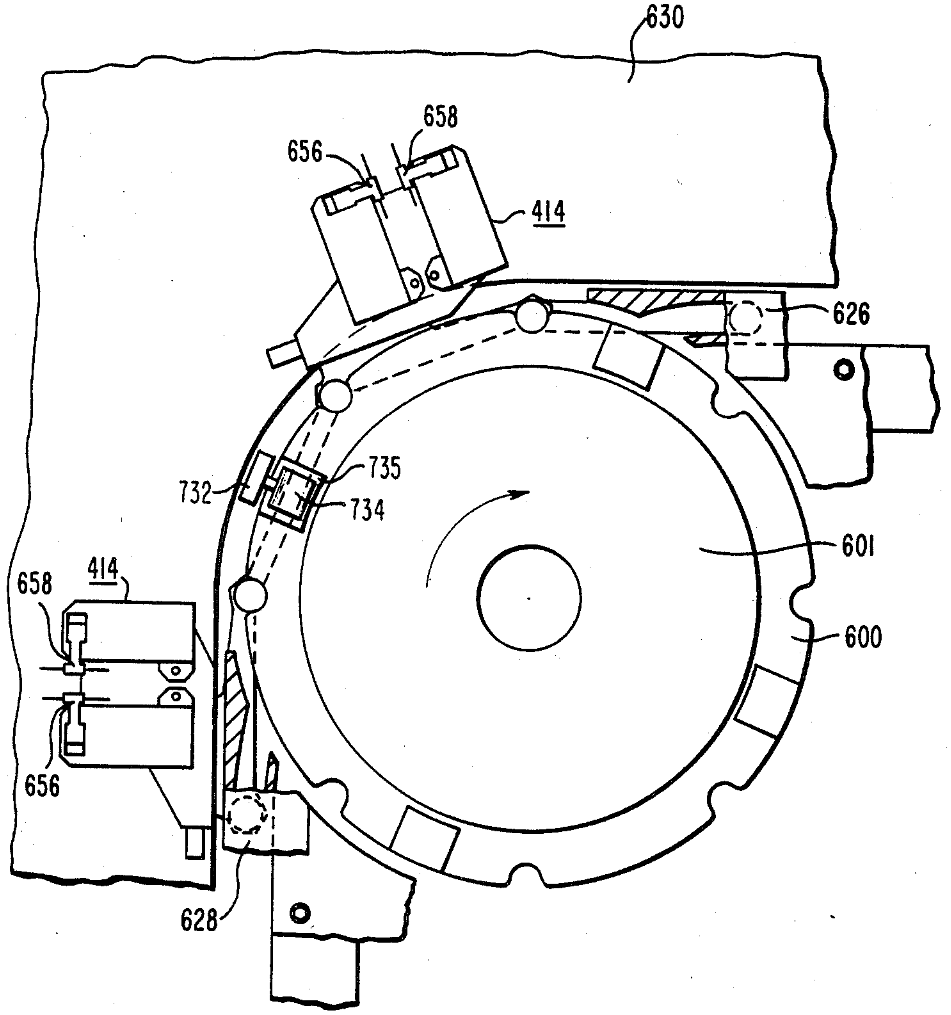
FIG. 4 is a top view of the sprockets including wire transport pallets attached thereto.

A plurality of pallets, with a typical wire transport pallet illustrated at reference numeral 414, are mounted on chain 416 which is advanced by drive sprocket members 418, 419, 420, 421 disposed in each corner of the generally rectangular central area 410 as is illustrated in FIG. 2. The container 412 mounted on each pallet holds a single wire with both terminal ends extending from the container. The details of the wire transport pallets and wire containers are seen in greater detail in FIGS. 5, 6 and 7, while details of the drive means are seen in FIGS. 3 and 4.

The initial workstation is seen in FIGS. 1 and 2 at the lower right corner and is a wire feed and cut station 422. A plurality of such wire feed and cut stations 422–426 are depicted to permit feeding wires of different diameter as required. In the experimental system these wire feed workstations were substantially identical except for modifications required by differing wire sizes. Such similarity is not required.

Figure 17:
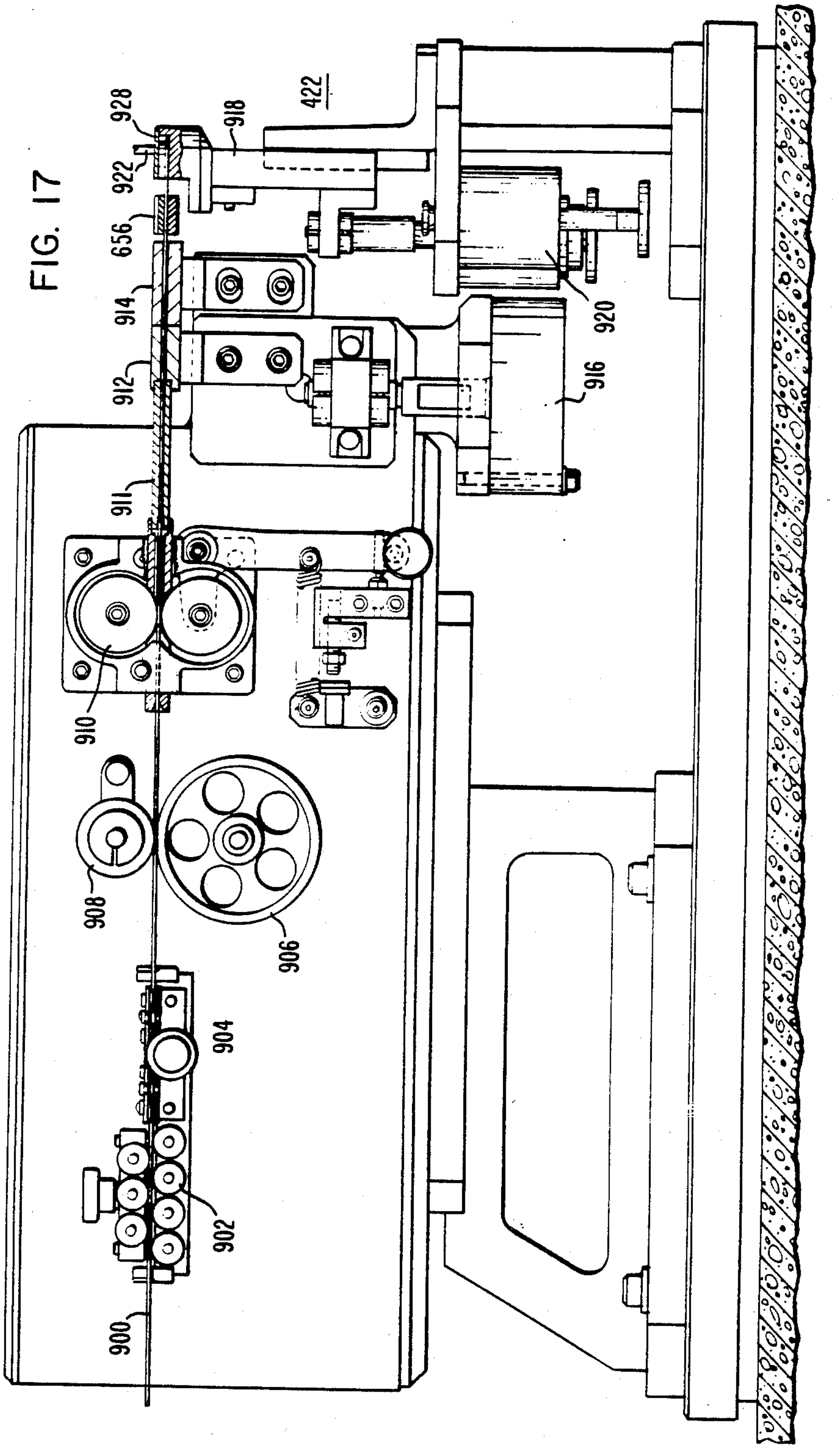
FIG. 17 is a side view of the wire feed workstation.
Figure 18:
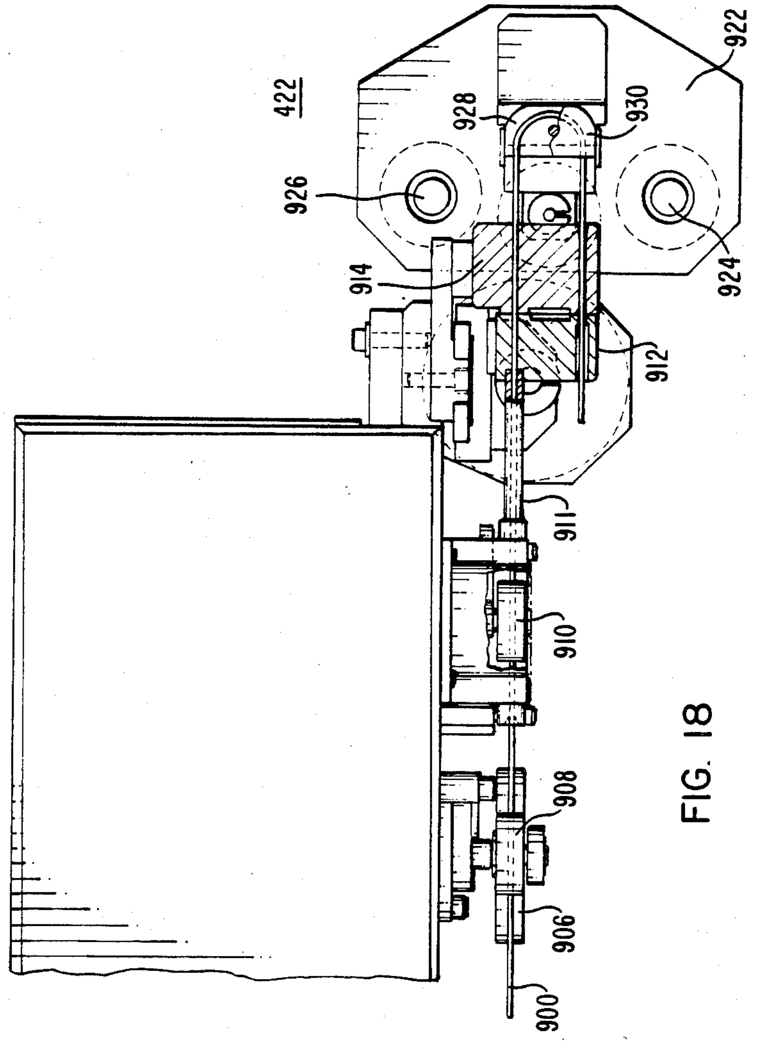
FIG. 18 is a top view of the wire feed workstation and wire turnaround.

The wire feed and cut stations are seen in greater detail in FIGS. 17 and 18. A single wire 411 of predetermined diameter is fed from station 422 into wire container 420 with the terminal ends 413, 415 of the wire supported in first and second wire clamps and extending from the clamps a predetermined distance in generally parallel relationship to each other toward the workstation as depicted generally in FIG. 2.

The wire transport pallet 414 with wire loaded in the wire container and supported by the first and second clamps is advanced to wire straightening workstation 428, where the extending terminal ends of the wire protruding from the wire support clamps are straightened and spaced a predetermined distance apart for presentment of the wire ends, 413 and 415, to the succeeding workstations. This wire straightening workstation 428 is seen in greater detail in FIG. 25.

A spare workstation 430 is seen in FIG. 1 after the wire straightening station 428, with the wire strip workstation 432 disposed adjacent as the next operating workstation. This strip workstation 432 functions to strip electrical insulation from a predetermined length at the extending terminal ends, 413 and 415, of the wire.

At the wire strip station 432, the ends 413 and 415 of the wire 412 are sequentially stripped. The first lead 413 is positioned in front of the stripper and the wire support clamp holding this lead moves outwardly inserting the lead 413 into the stripper workstation 432 where the stripping operation is performed. Horizontal indexing means included in the wire transport pallet indexes the wire left positioning terminal end 415 in front of the stripper 434 and the above discussed cycle is repeated for the second lead.

The next workstation is a wire strip verification station 434 which senses whether the insulation has in fact been removed from the wire terminal ends by generating and analyzing a TV image of terminal portions, 413 and 415, of wire 412.

If it is determined the wire 412 has been stripped properly, the wire transport pallet holding this wire is advanced to the next wire preparation workstation. If the stripping operation has not been properly carried out, a signal is sent to control system 402 to ensure that the pallet with the improperly stripped wire is advanced around to the unload station without attempting further wire preparation operations or an operator can intercede and complete the stripping operation.

The other workstations that are next in line may or may not be used depending on the type of wire termination which is to be placed on each wire end. The control system keeps track of which wire is at each workstation and provides control signals to the appropriate workstation to ensure that the proper wire preparation operation and wire termination is provided. The wire terminations may be a pin contact which is insertable into an electrical connector, a terminal lug of the eyelet or U-shaped variety, or any variety of special termination means.

In FIGS. 1 and 2, the wire preparation system is seen with a layout of 32 workstation spaces, and workstations numbered 436–468 are dedicated to specific operations for mounting electrical terminations on the wires. Workstations 436, 438, and 440 are lug or contact mounting and crimping stations. Station 442 is a soldering flux application workstation, and station 444 is a solder tinning workstation where solder is applied to wire ends to which soldering flux was applied at flex station 442. Station 446 is a cleaning station for removing excess soldering flux from the solder tinned wire ends. Station 448 is a spare station. Stations 450 and 452 are contact mounting and crimping workstations for different electrical terminations than stations 436–440. Stations 454, 456, and 458 are still other contact mounting and crimping stations. Station 460 is a spare station, while stations 462, 464, 466, 468 are yet other contact crimping stations. These workstations 436–468 are directed to the mounting and securing of the desired wire termination on the desired wire terminal ends. The control system ensures that the proper termination is made for each wire terminal end, following the cable harness and wire preparation design and manufacturing data.

Each wire transported in a wire container upon an individual wire transport pallet then advances to the pull test workstation 470 at which station the integrity of the electrical termination or contact on each end of the wire is tested. The wire is grasped above the termination and also the termination is engaged and pulled along the direction of wire extension to ensure that there is secure mechanical and electrical engagement between the termination and the wire end. This wire pull workstation 470 can be seen in greater detail in FIG. 27.

Figure 28:
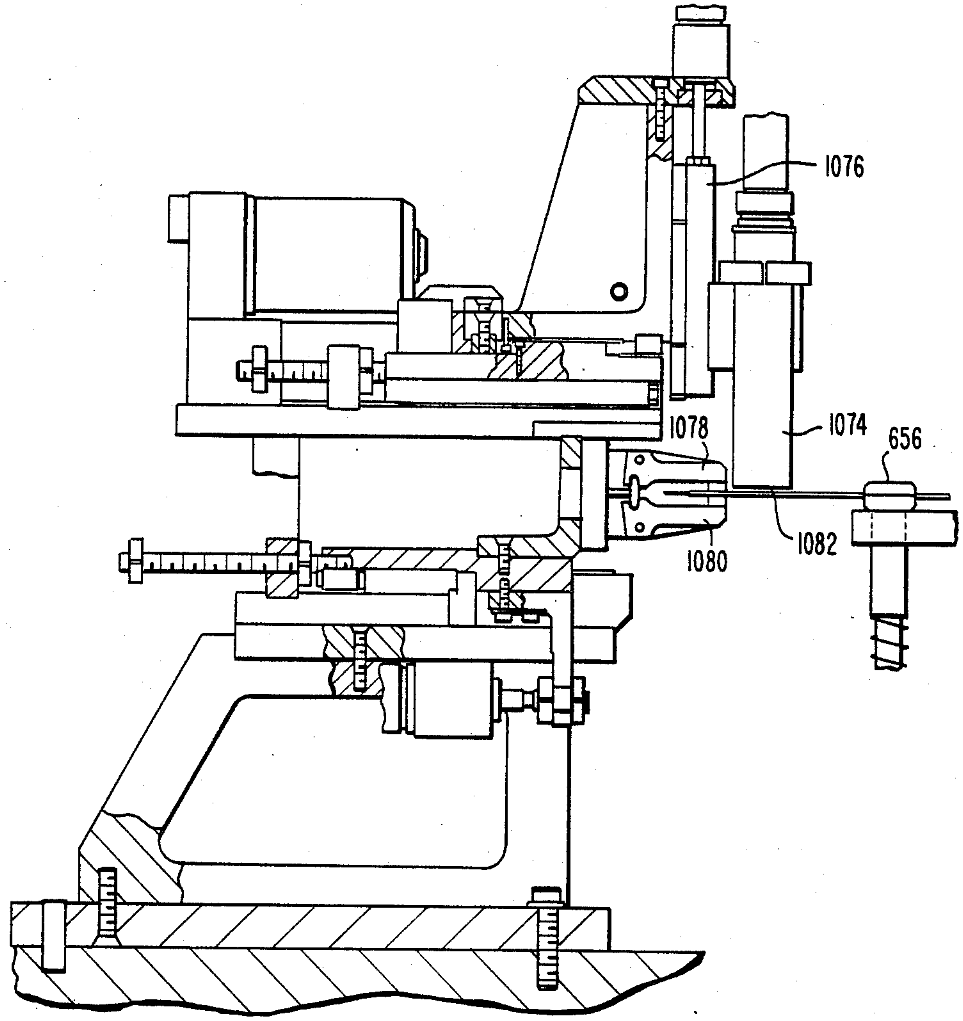
FIG. 28 is a side view of the wire marking workstation.

The wire is then advanced to an inkjet marking station 472 which is seen in greater detail in FIG. 28. Identification markings are sprayed onto the wire insulation near each of the wire terminal ends. The identification marking is controlled as are all workstations by control system 402, and the identification code for each wire end is determined by the cable harness design and manufacturing data. The inkjet marked wire is then advanced to the ink drying workstation 474 which applies heat to dry the ink and complete wire identification marking.

In the embodiment of FIG. 1, two wire unloading workstations 476, 478 are depicted, with another spare workstation 480 completing the 32 workstations. At the wire unload stations the wires which have been fabricated in moving around the wire preparation system are removed from the system, and may be directly transported to a cable harness assembly system. This transport may be by way of a simple robot arm with end effector which engages at least one end of the terminated wire and removes it from the wire container and feeds it directly to the cable harness assembly system.

The wires may be retained in the wire containers, and the containers may be off-loaded and either transported, stored, or directly fed into another cable harness assembly system. The robot arm end effector may engage both of the terminated ends of the wire for unloading the wire from the wire container, and either feed one wire end directly to a cable harness assembly system or feed the wire to storage means for later use.

Of course the number of workstations can be varied as can be the functions of the specific workstations in carrying out the purpose of the wire preparation system.

FIG. 2 illustrates the wire transport pallets, and the chain and sprocket drive system for advancing the pallets about the wire preparation system. The two wire terminal ends are seen extending toward the respective workstation with which the wire transport pallet is aligned. At each workstation, the wire transport pallet can be activated by the control system to advance the wire terminal ends toward the workstation singularly or together and index the wire terminals horizontally a predetermined distance to present the terminal ends of the wire to individual workstations in a standardized manner for purpose of performing wire preparation task.

Although the operation of the system was described above with reference to a single wire being processed, it will be appreciated, that each workstation is capable of performing its assigned wire preparation task independently of all other station. That is to say, that at a particular time, wires requiring a wire preparation task may be positioned at a plurality of workstations, in which case, the control system 402 will initiate all workstations required to perform a wire preparation task and inhibit indexing of the transport system until all of the workstations have completed their task. Stated another way, at any particular time the workstation having the longest cycle time controls the indexing interval.

FIG. 3 is a drawing partially in cross section illustrating one of the sprockets for supporting the drive chain and its relationship to the main support table (structure) 620 as illustrated in top view in FIG. 2. The sprockets includes top and bottom section with the top section consisting of an inner circular member 601 and an outer ring member 600. The bottom section consists of a single circular member 602 with the top and bottom sections spaced apart by a cylindrical spacer 604. The two sections of the sprocket are secured to the spacer 604 using any convenient means such as screws.

The bottom member 602 of the sprocket is affixed to a flange member 606 which is affixed to a hollow shaft member 607. Upper and lower support bearings 608 and 610 support the hollow shaft member 607 with both of the support bearings ultimately being affixed to a support plate 612. Support plate 612 is in turn supported by the remainder of the table structure collectively illustrated at reference numeral 620. For convenience, the table structure 620 is provided with leveling devices illustrated at reference numerals 622 and 624.

The structure described above is essentially repeated at each of the drive sprockets illustrate in FIG. 2 with the exeception that at one corner a motor is coupled to the shaft 607 so that the chain transport mechanism can be driven, in indexed increments, around the path as illustrated in FIGS. 1 and 2. The control system 402 actuates the drive motor to incrementally position the wire transport pallets at each of the workstations where wire preparation functions are performed, as required.

FIG. 4 is a top view of the sprocket mechanism illustrated in FIG. 3, including a portion of the table top structure 630, around which the various workstations, are positioned and including portions of the guides 626 and 628 positioned along the straight edge of the system to provide support for the drive chain. The drive sprockets illustrated in FIGS. 3 and 4 have a diameter of approximately 3 feet with the links of the transport chain being in the neighborhood of 1 foot long. This results in a shortening of the effective path length around the sprockets due to the fact that the chain does not blend (conform) to the outer circular periphery of the sprocket. Instead, the links of the chain form straight line segments between notches in the sprocket 600. Without compensation for this phenomenon, the tension on the drive chain changes depending on the angular position of the drive sprockets. To compensate for this phenomenon, the channels 626 and 628 do not approach the drive sprocket 600 tangentially in a straight line. Instead, a short distance from the sprocket the drive channels curve inwardly and then outwardly, causing the drive pins of the chain to be deflected inwardly a short distance as the drive pins of the chain approach and depart from the sprocket. This tends to maintain the tension on the chain constant as the sprockets rotate to index the chain to position the wire transport pallets at the workstations.

Along the straight edges, the drive chain is vertically supported by vertical support rollers, a typical roller illustrated at reference numeral 734, which travel on the upper surface of the roller guides, 626 and 628. As the vertical support roller 737 approaches the sprocket 600, support is transferred from the top surface of the roller guide 628 to a support block 735 which is affixed to the upper surface of the ring member 600. A vertical support roller 735 is provided between each wire transport pallet 414 resulting in vertical support blocks 734 being provided between every other notch on ring member 600.

As previously explained, the function of the wire transport system is to transport pre-cut lengths of wire to various workstations in a standardized manner. More specifically, the wire transport pallets 414 are affixed at equidistant locations to the transport chain, as illustrated in FIG. 4. Each of the wire transport pallets 414 includes first and second wire support clamps 656 and 658, with first and second ends 413 and 415 of the wire extending outwardly from the wire support clamps, 656 and 658. The wire extends outward from the wire support clamps, 656 and 658, and is coiled on the inside of a round container 649 (FIG. 5) having tapered edges. The wire holding clamps, 656 and 658, are affixed to first and second substantially rectangular plate members, 660 and 662. The rectangular plate members, 660 and 662, which are in turn affixed to two additional plates, which are not visible in FIG. 5, such that rectangular plate members, 660 and 662, are free to slide forward independently; however, they are normally held in the retracted position first and second by coil springs, 661 and 663.

Figure 5:
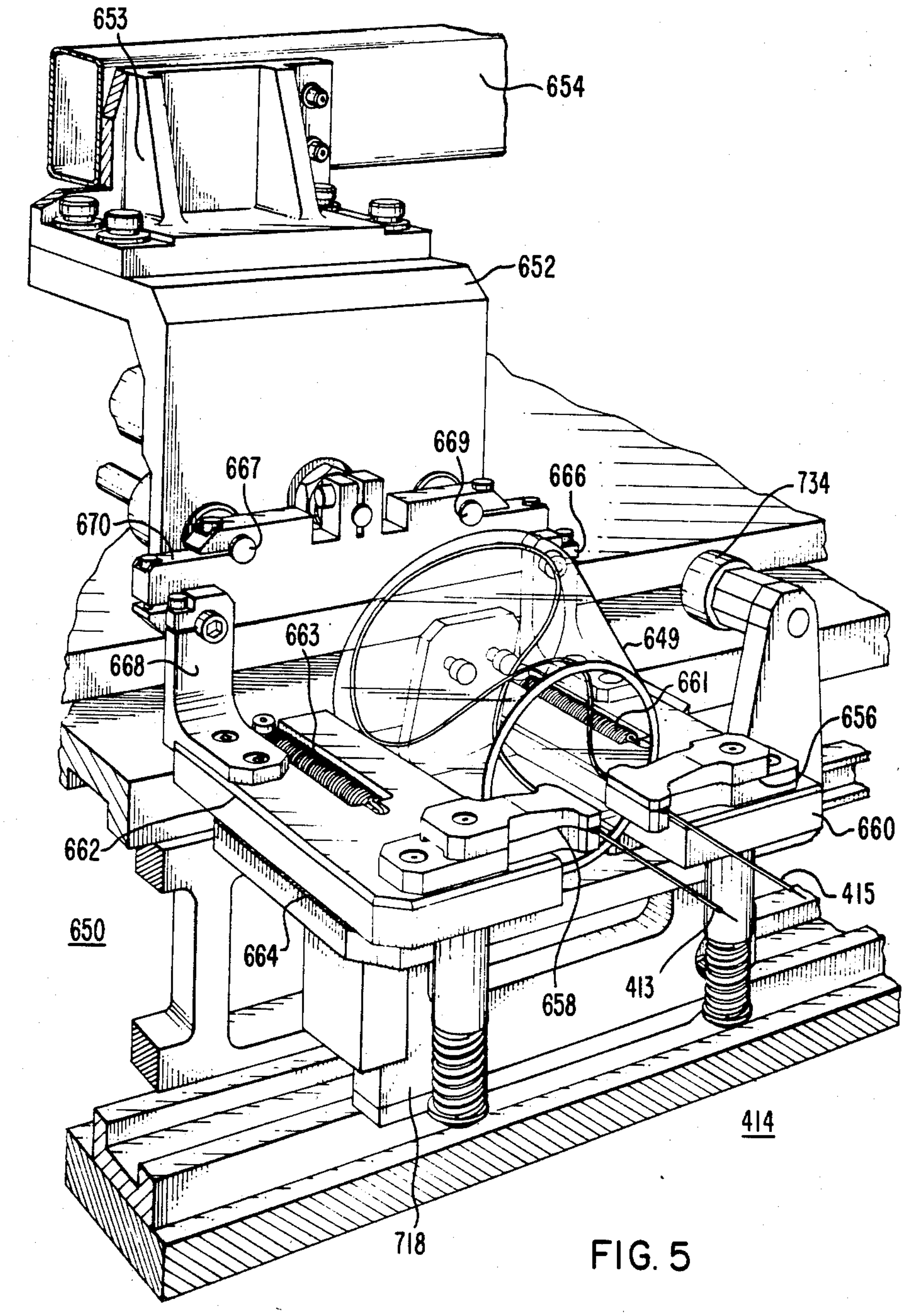
FIG. 5 is a pictorial view of the wire transport pallet.

Affixed to the ends of rectangular plate members 660 and 662, at the end opposite from the wire support clamps, 656 and 658, is two L-shaped push brackets, 666 and 668. A push bar 670 is slidably affixed to the support bracket 652 by two support rods, 667 and 669. An actuator pushes (not visible in this illustration) the push bar 670 forward, contacting push brackets, 668 and 667, to push the wire holding clamps, 656 and 658, forward a predetermined amount. In FIG. 5, the length of the push bar 670 is selected such that it contacts both of the U-shaped push brackets, 666 and 668, such that both ends of the wire, 413 and 415, are pushed forward a predetermined amount. When the ends of the wire are pushed forward, they are positioned such that a workstation can perform a wire preparation task such as stripping or labeling the wire as subsequently explained. That is to say, all of the workstations are designed such that when a wire support pallet 414 having a wire positioned in the wire support clamps, 658 and 660, is positioned in front of the workstation and the wire support clamps is in the forward position, the wire ends 413 and 415 will be within the working range of the workstation.

Figure 6:
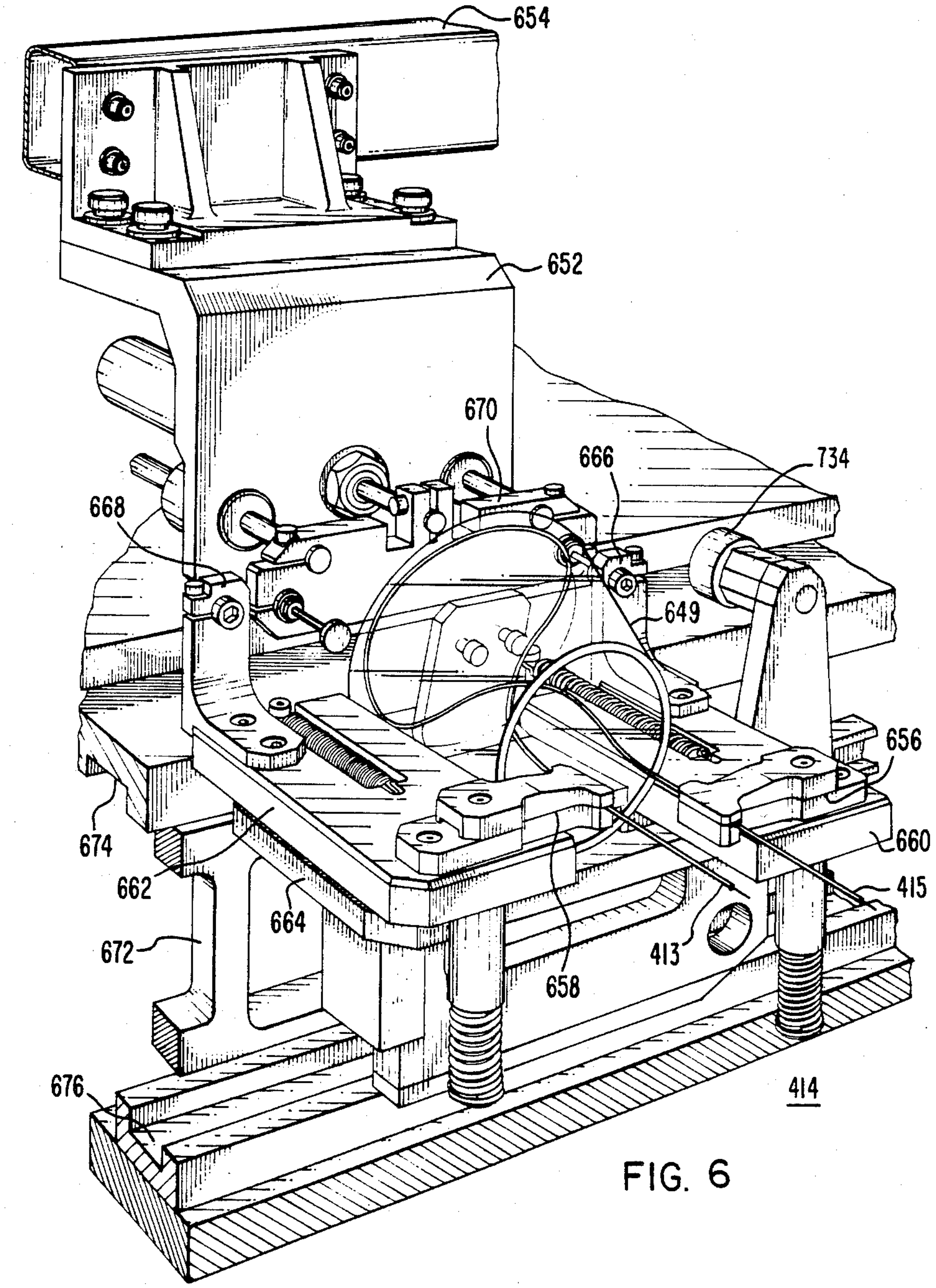
FIG. 6 is a pictorial view of the wire transport pallet with one of the wire clamps extended.

FIG. 6 illustrates an alternate arrangement for pushing the wire holding clamps, 656 and 658, forward to present the ends of the wires, 413 and 415, to the work various station. In this illustration, the length of the push bar 670 is selected to be less than the distance between the push clamps, 666 and 668. The clamp holding mechanism is then positioned such that the push bracket 666 affixed to the plate member 660 is in front of one of the ends of the push bar member 670. The second end fails to contact the second push bracket 668 as the push bar 670 is pushed forward. Thus, it only moves the first end 415 of the wire to the forward position to be within the working range of one or more of the workstations. Alternatively, as subsequently explained and illustrated, the wire support clamps, 656 and 658, can be repositioned such that the second clamp member 658 is pushed forward. Thus, as illustrated in FIGS. 5 and 6, the wires are contained in a container 666 and transported between each of the workstations in a standardized manner with the functions of the individual workstations determining what wire preparation operations are to be performed and whether wire ends, 413 and 415, are individually or singularly presented to the workstation.

Figure 7:
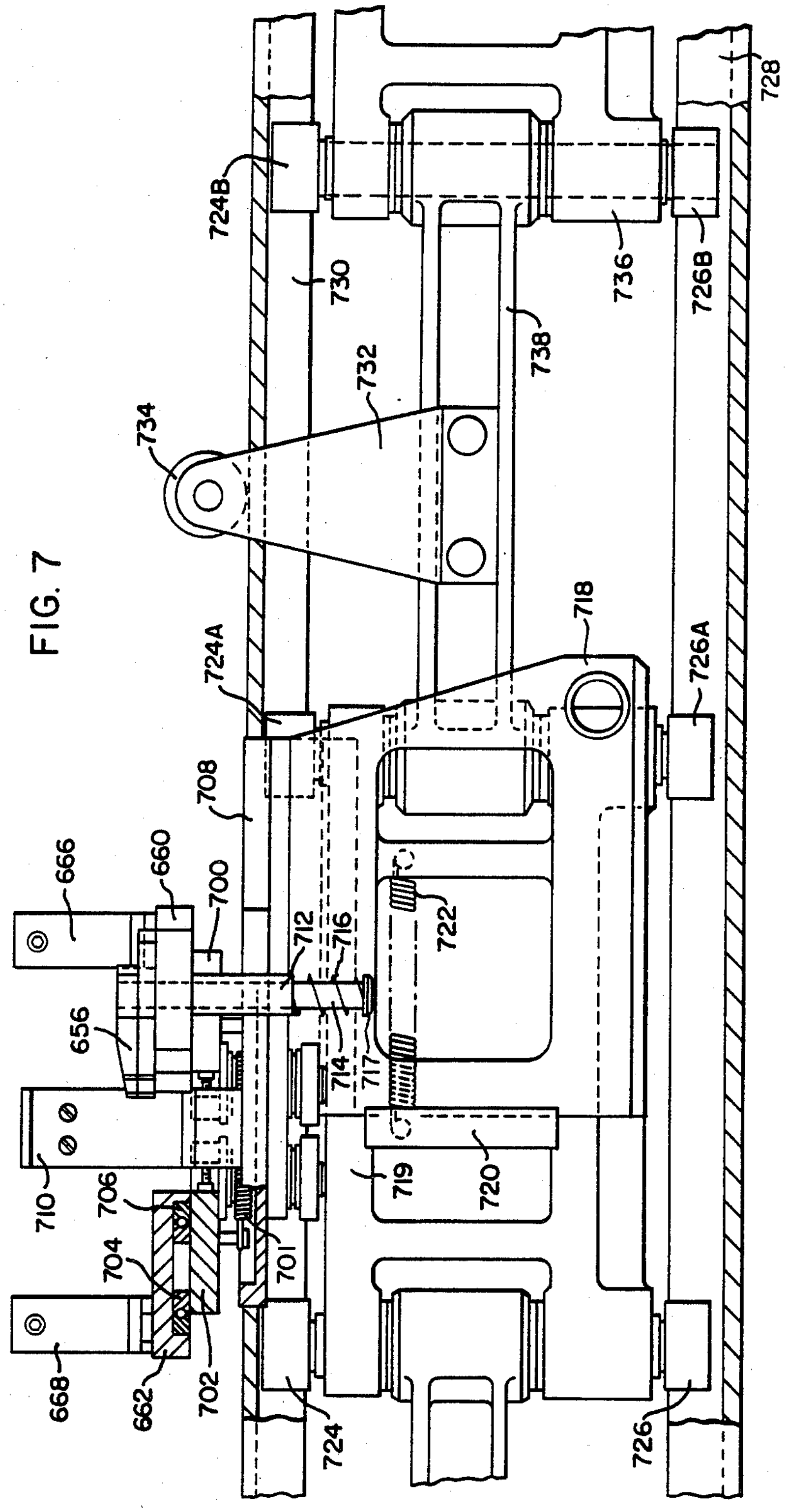
FIG. 7 is a front view illustrating the wire transport pallet, the transport chain and support track.
Figure 8:
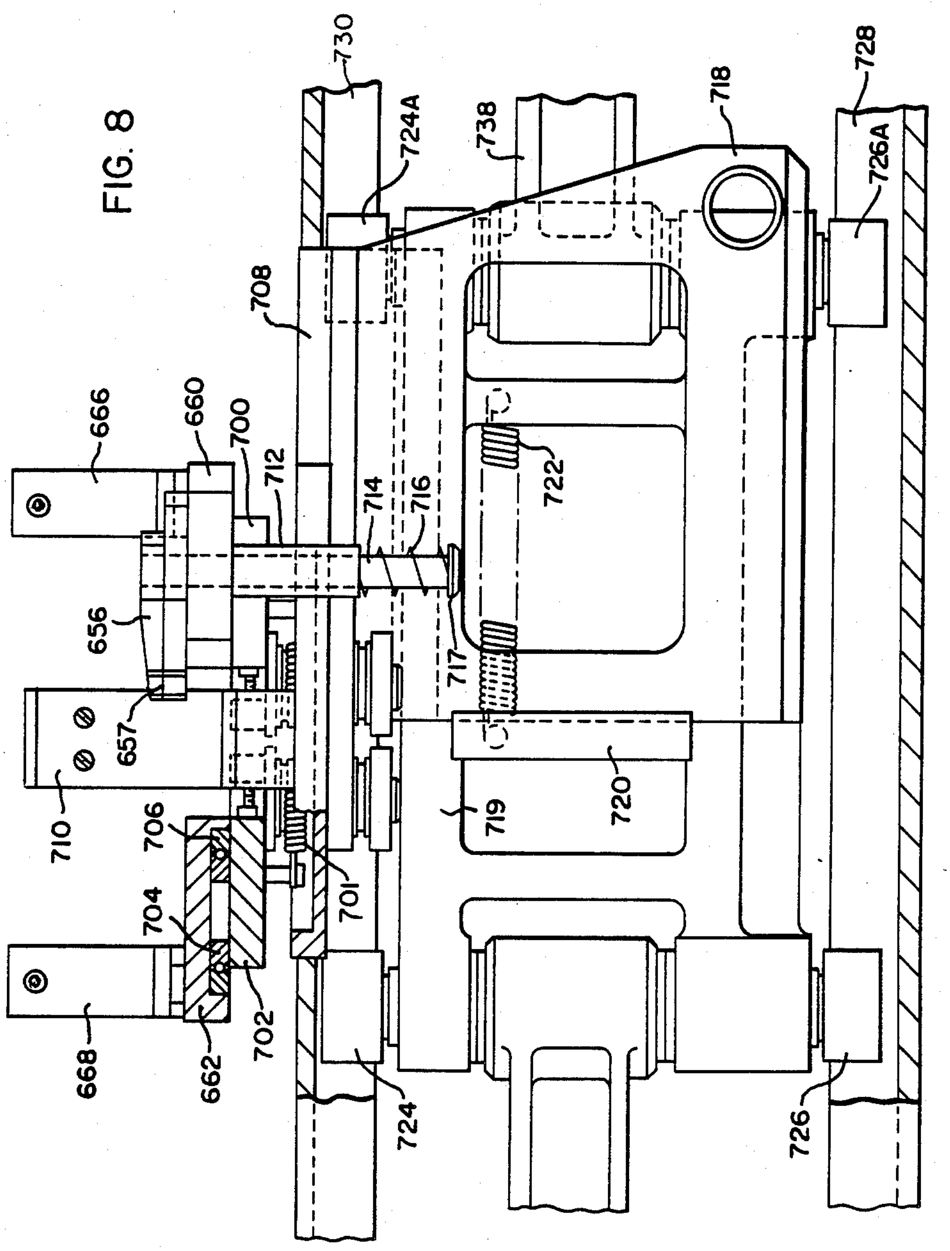
FIG. 8 is a front view of the wire transport pallet and the transport chain.

FIGS. 7 and 8 are front views of the wire support clamps, 660 and 662, along with the details of the supporting structures attaching these wire support clamps to the transport chain. FIGS. 7 and 8 differ primarily in the fact that in FIG. 7 additional portions of the transport chain is shown. More specifically, FIG. 7 illustrates two complete links of the transport chain while FIG. 8 includes one link and portions of two other links.

Wire support clamp 656 is a mirror image of wire support clamp 662. Wire support clamp 656 includes top and bottom portions with grooves at the intersection to hold the wire ends positioned therein. The bottom portion of the wire holding clamp 656 is affixed to the top surface of the rectangular plate 660. The bottom portion of clamp includes an opening therethrough through which a rod 714 extends and is affixed to the top portion of the wire support clamp 656. Concentric with the rod 714 is a cylindrical portion 712 which is affixed to the bottom portion of rectangular plate 660. A coil spring 716 surrounds the center rod portion 714 and rests on the bottom end of the cylindrical portion 712 and a flange portion 717 which is affixed to the bottom end of the rod portion 714. This spring normally retains the two portions of the wire support clamp 656 together to support the wire end positioned in the groove. To open the clamp 656, a suitable pusher is provided to push upward on the flanged portion 717, as subsequently described in more detail.

The views illustrated in FIGS. 7 and 8 have been selected such that the second wire holding clamp 658 is not visible in order to illustrate the underlying structure. More specifically, the rectangular portion 662 is shown in cross section to illustrate that the bottom portion of the rectangular plate 662 includes a grooved portion. Positioned in the groove is two slide bearings, 704 and 706, with the inner portions of these bearings affixed to plate 702 and the upper portion affixed to the rectangular plate 662. This permits the rectangular plate 662 to be pushed forward to extend the wire support clamp 658 affixed thereto to position the wire held in the wire support clamp 658 to a workstation which is to perform a wire preparation operation. Similarly, plate member 660 is a mirror image of 662 and is similarly affixed to plate 700.

Although not shown in detail in FIGS. 7 and 8, rectangular plates 700 and 702 are affixed near the back inner corners to top bracket plate 708 such that they can rotate outwardly such that the distance between wire support clamps, 656 and 658, can be increased. Normally the clamps, 656 and 658, are held in the position illustrated in FIG. 7 by a coil spring 701 having its alternate ends attached to plates, 700 and 702, near the front.

As discussed above, plates 700 and 702 are affixed to the top support plate 708 near their inner rear corners such that they can rotate. Top plate 708 is then affixed to a vertical plate 718 which is in turn slidably mounted to a first link 719 of the transport chain. A coil spring 722 having its alternate ends affixed to the link of the chain 719 and a spring bracket 720 holds the vertical support plate 718 in the rightmost position, as illustrated in FIGS. 7 and 8.

The links of the chain are of two types with the types alternating as illustrated at reference numerals, 719 and 738, in FIG. 7. Each link of the chain is affixed to its adjacent link by a pin, with a typical pin being illustrated at reference numeral 736 in FIG. 7. The pins 736 attaching the links of the chain together extend through the links and have rollers, 724 and 726, attached to the alternate ends. Along the straight edges of the system, the rollers 724 and 726 travel in tracks to restrain the transport chain in a substantially vertical position and maintain it traveling in a straight line. Affixed to the center web of the link member 738 is a vertical bracket 732 which extends up and over the upper track 730 and includes a vertical support roller 734 which travels along the upper surface of the track 730. This bracket 732 and vertical support roller 734 supports the transport chain in a vertical direction to prevent sagging.

Figure 9:
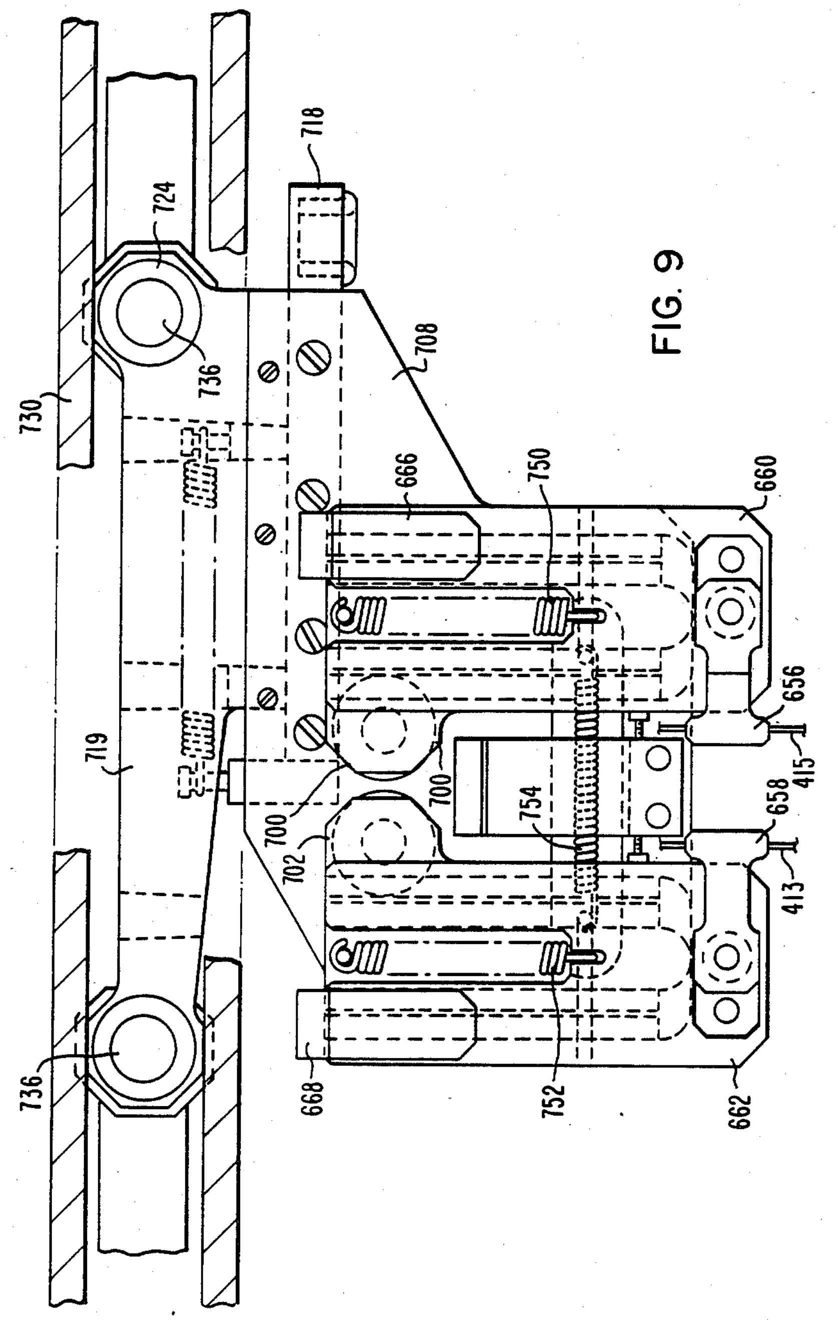
FIG. 9 is a top view of the apparatus illustrated in FIG. 8.

FIG. 9 is a top view of FIG. 8. As can be seen from this view, the rectangular plates, 660 and 662, to which wire holding clamps, 656 and 658, are affixed is mounted above and slidably attached to plates, 700 and 702. Two coil springs, 750 and 752, respectively have their alternate ends affixed to plates, 660 and 662, and to plates, 700 and 702. Two springs, 750 and 752, normally hold the wire support clamps, 656 and 658, in the positions as indicated in FIG. 9. As previously noted, plates 700 and 702 are rotatably mounted near their back inner corners and held in the inward position by a spring 754 attached near the front portion of these springs. For completeness of description the push brackets, 666 and 668, are shown in top view affixed to the top plates, 660 and 662. The vertical plate 718 is also attached to the support plate 708 with the entire assembly affixed slidably as previously discussed to link 719 of the transport chain. Typical, pins attaching the links of the transport chain are shown at reference numeral 736 with a typical vertical support roller positioned in the upper track 730 illustrated at reference numeral 734 (FIG. 7).

Figure 10:
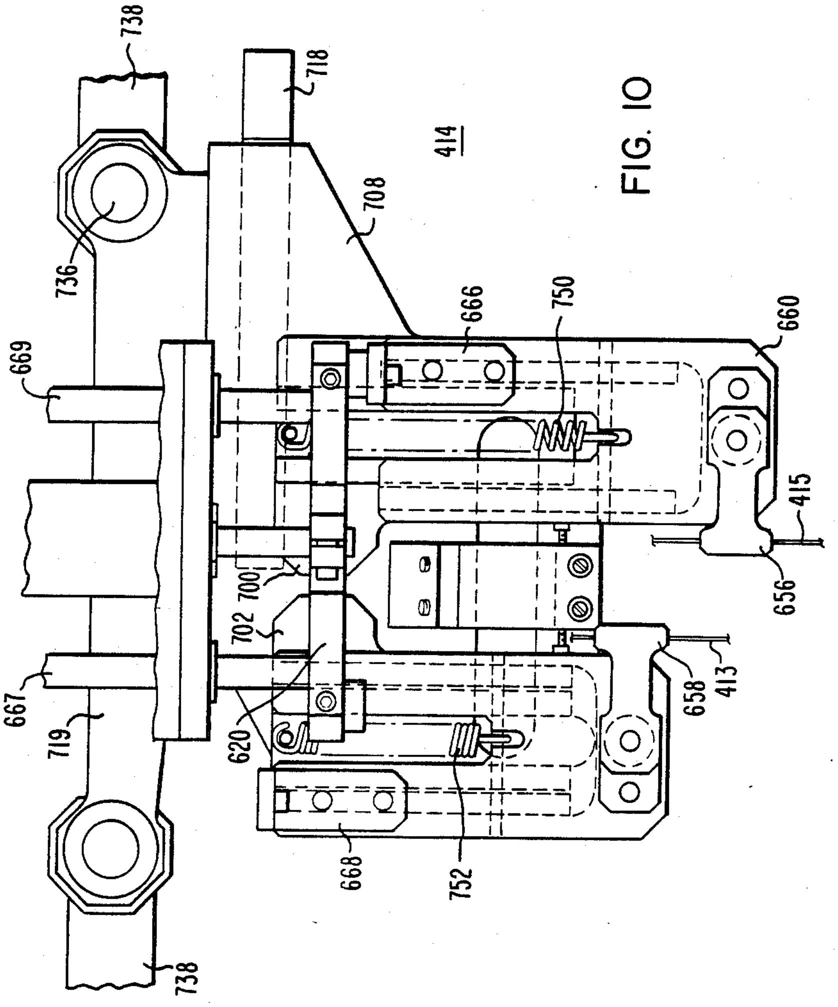
FIG. 10 is a top view of the apparatus illustrated in FIG. 9 with one of the wire support clamps extended.

FIG. 10 is a top view of FIG. 9 with the right wire support clamp 656 extended. The extention of clamp 656 is accomplished by actuating the push rod 669 moving push plate 670 forward until it contacts the push bracket 666 moving the top plate 660 forward along its slidable mount and extending retaining spring 750. Except for this extension, FIG. 10 is essentially the same figure as FIG. 9 and similar reference characters are used to identify the parts. This being the case, no further discussion of FIG. 10 is believed to be required.

Since wire support clamp 658 is a mirror image of wire support clamp 656, it can be similarly extended by repositioning the wire transport pallet 414 horizontally, as subsequently described.

As previously discussed, the vertical support plate 718 and the wire support clamps, 656 and 658, affixed thereto can be moved horizontally to a position the wires, 413 and 415, held in the wire support clamps, 658 and 660, as desired. Plate 718, as previously discussed is slidably mounted on the chain link 719.

Figure 11:
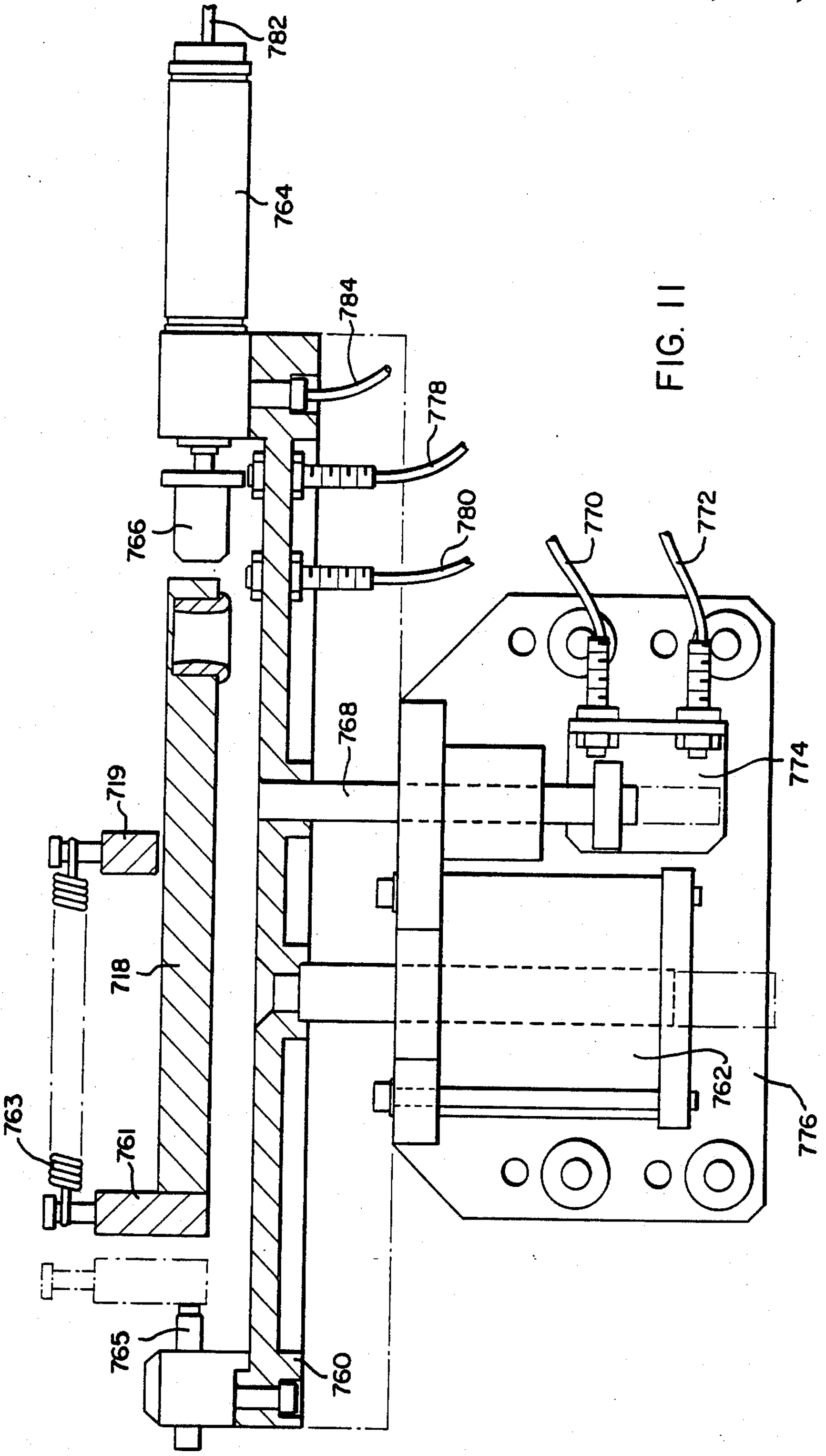
FIG. 11 is a top view of the horizontal translator for the wire transport pallet.

As previously discussed and further illustrated in FIG. 11, attached to the left end of the vertical plate 718 is a bracket 761 which extends backward and has the first end of a spring 763 affixed thereto. The second end of the spring 763 is affixed to the chain link 719 holding the plate 718 normally in the rightmost position. A horizontal translator which includes a bar 760 which has attached to its left end a stop 765. Affixed to the right end is a pneumatic cylinder 764 which includes a pusher 766 affixed to the end of the piston rod of the pneumatic cylinder 764. A support plate 776 has affixed thereto the pneumatic cylinder 762 which moves the bar 760 fore and aft such that in the forward position as shown in FIG. 11 the stop 765 extends to limit the leftward motion of the support plate 718 while the pusher 766 is in a position such that when the pneumatic cylinder 764 is actuated, the pusher 766 contacts the left end of plate 718 causing it to move in a leftward direction. Two sensors 778 and 780 respectively sense the two extremes of the motion of the pneumatic actuator 764 thus providing a signal indicating the position of the plate 718. Also support plate 718 includes a bracket 774 having two other sensors 770 and 772 attached thereto which detect the two extreme positions of the bar 760. Thus, apparatus is provided for pushing the support plate 718 and the wire support clamps, 658 and 660, affixed thereto between its two positions and for detecting these alternate positions.

Figure 12:
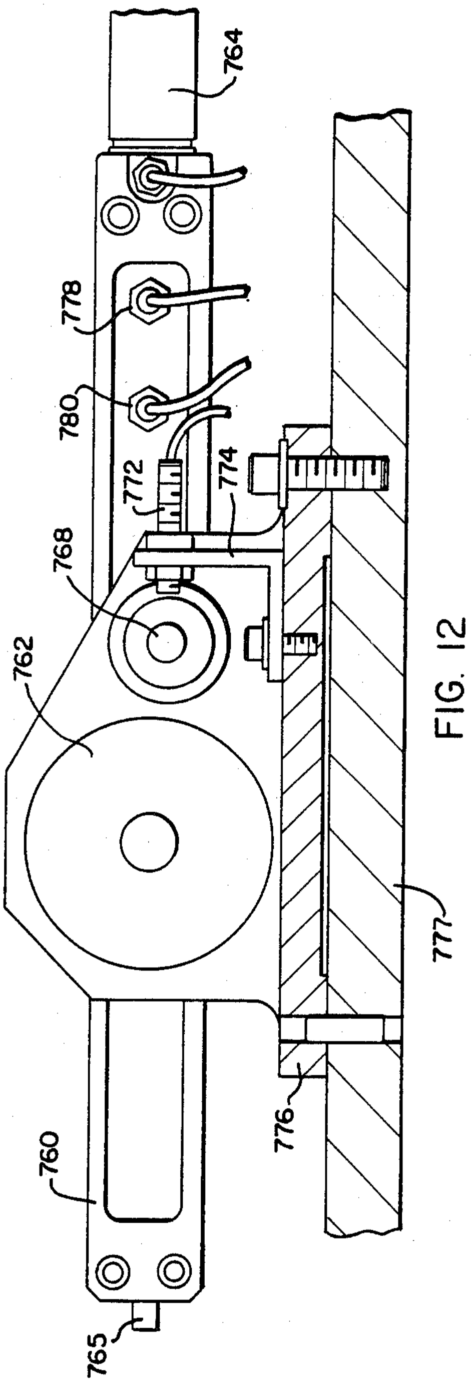
FIG. 12 is a front view of the horizontal translator for the wire transport pallet.

FIG. 12 is a front view of the apparatus illustrated in FIG. 11. This figure clearly illustrates that the support bracket 776 ultimately supports the bar 760 and the pneumatic cylinder 764 affixed thereto in a fixed position through attachment of the bracket member 776 to the table top 777 of the system. Thus, the pusher mechanism is retained in a fixed position while the drive chain transporting the wire support clamps, 658 and 660, is also fixed by the drive chain indexing system. Thus actuating the pusher mechanism 764 moves the wire support clamps between their leftmost and rightmost positions for alternatively presenting wires, 413 and 415, to the various apparatus for wire preparation tasks.

Figures 13, 14:
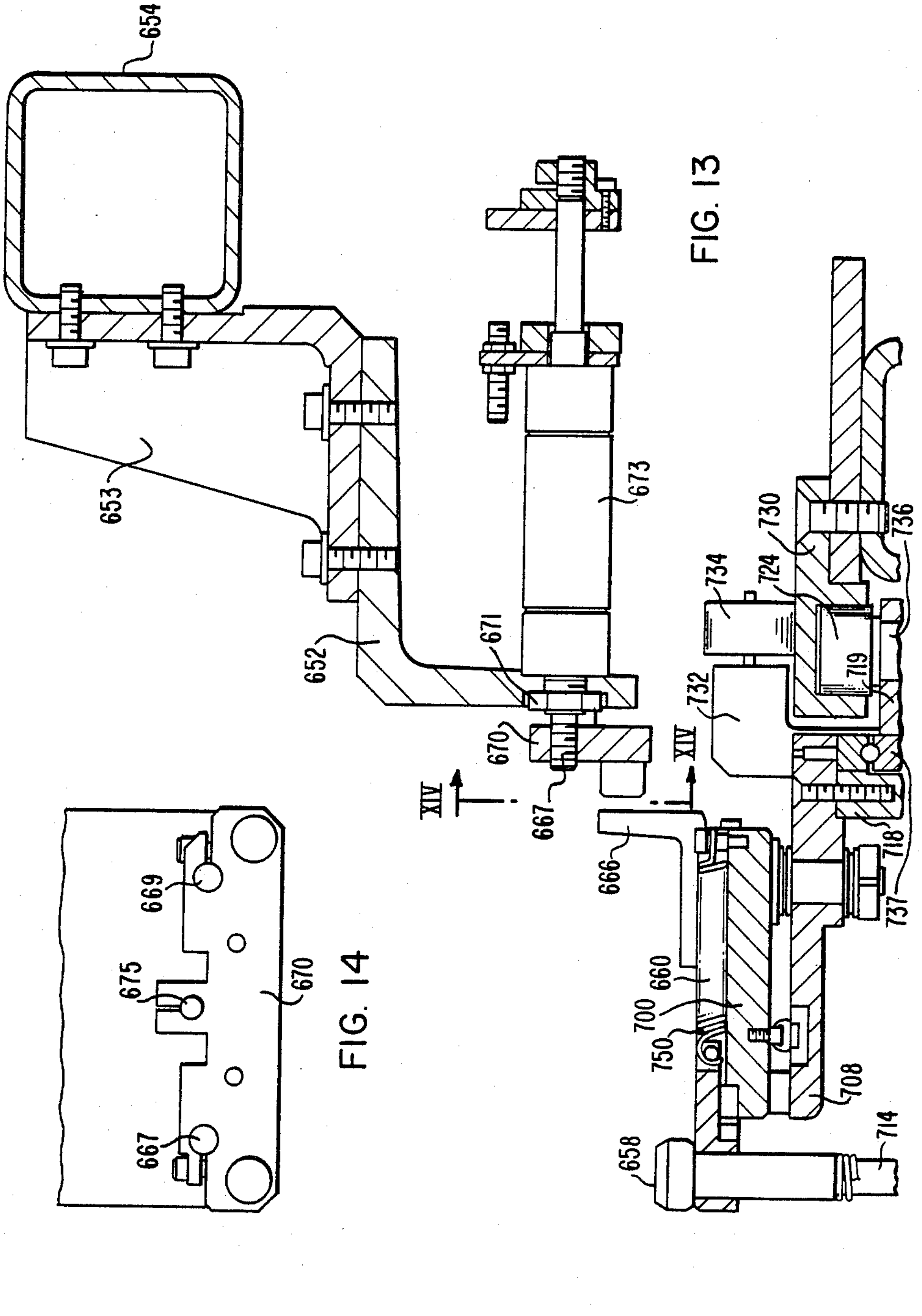
FIG. 13 is a side view of the wire support clamp and pusher.
FIG. 14 is a front view of the horizontal translator.

FIGS. 13 and 14 illustrate the relationship between the wire clamp pusher mechanisms and the wire support clamps, 658 and 660. More specifically, in FIG. 13 the right wire support clamp 658 is illustrated in cross section. This clamp as previously discussed is affixed to the top plate 660. The spring 750 which is in turn affixed to the bottom plate 700 tends to retain plate 600 in the rightmost (in this illustration) position. Affixed to the top of plate 660 is the pusher bracket 666.

Structural member 654 is a part of the fixed (non movable) structure of the system. Affixed to this bracket is a second intermediate bracket 653 to which the pusher mechanism is affixed. Specifically, the pusher bar 670 is affixed to bracket 652 by two slide guide tofd 667 and 669. These guide rods are supported in the bracket 652 by two guide bushing mechanisms with the bushing for guide rod 669 illustrated at reference numeral 671. A pneumatic cylinder 673 includes a piston rod 675 which extends through bracket 652 and is affixed to the pusher bar 670. Thus actuating the pneumatic cylinder 673 causes the pusher bar 670 to move forward and contact the pusher brackets 666 to move the wire support clamps, 658 and 660, to their forward position. Sensors are included to generate position signals which are coupled to control system 402 (FIG. 1).

Additionally in this view the guide track 730 for the rollers 724 is also shown. The slide bearing mechanisms 737 which holds the plate 708 to the link of the chain 719 are also illustrated. Similarly, it is clear from this view that the bracket 732 extends inwardly and over the guide rail 730 such that the roller 734 rolls on to top of the guide channel 730 to retain the chain links in the affixed vertical position.

Figure 15:
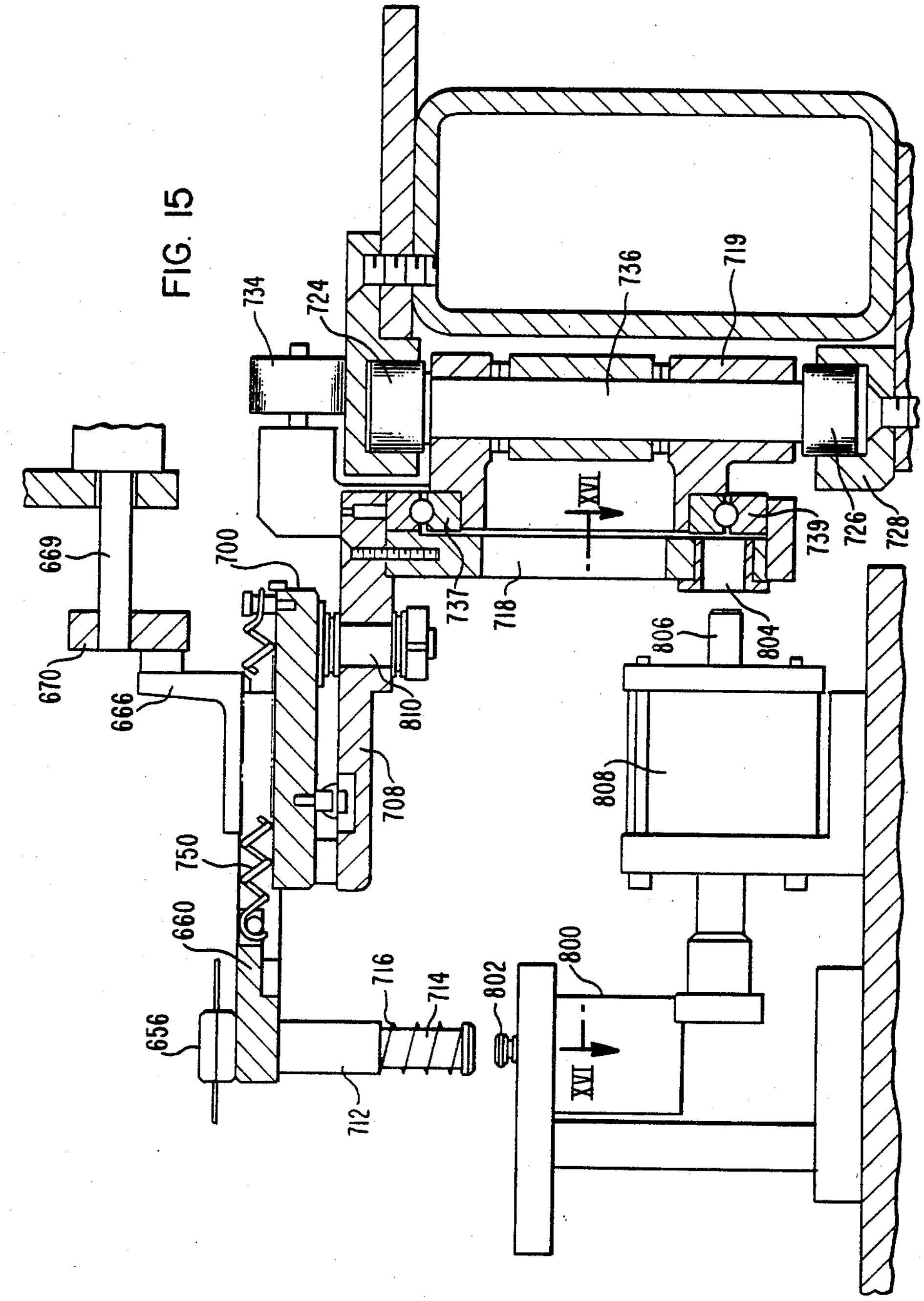
FIG. 15 is a cross-section of the wire support clamp and drive chain.

FIG. 15 is a more detailed view illustrating components of the transport chain, the wire support clamp opening mechanism as well as the clamp pushers. More specifically, the wire support clamp 656 is shown in its forward or extended position. The pusher pneumatic cylinder 673 (FIG. 3) has been actuated to push the pusher bar 670 in its forward position. In this position the pusher bar 670 contacts the pusher bracket 666 and moves the top plate 660 to its forward position. This causes the coil spring 750 to be exteeded as shown.

As in previous illustrations, it is clear that the top plate 660 is affixed slidably to the underlying plate 700. Plate 700 is then affixed to plate 708 by a pin and bearing mechanism 810 which permits the plate 700 to rotate with respect to the support plate 708. This feature will be subsequently discussed in more detail.

Additionally in this view the wire support clamp 656 opening clyinder 800 is illustrated. This is a pneumatic cylinder having a plunger 802 which is positioned to contact the bottom end of push rod 714. This push rod is in turn connected to the top portion of wire clamp 656, as previously discussed and illustrated. When the pneumatic cylinder 800 is actuated causing its plunger to move up, coil spring 714 is compressed, causing the top portion of clamp 656 to be moved upward, thus opening the wire support clamp 656.

The wire support clamps, 656 and 658, are operated in a standardized manner at each position where opening of the clamps is required to perform the required wire preparation function. Thus, a pneumatic cylinder of the type illustrated at reference numerals 800 is positioned at each workstation requiring wire support clamps to be opened. Position sensors are included to generate position signals which are coupled to control system 402 (FIG. 1) to indicate which clamps are open and closed.

At selected workstation positions it is necessary to provide indexing means which positions the wire support clamps more accurately with respect to the workstation than is conveniently provided by the main drive indexing mechanism for the transport chain. For example, the wire feed and cut workstations require accurate horizontal and vertical positioning. Such accurate horizontal indexing is provided by including in the vertical plate 718, an indexing hole 804. After the transport chain has been indexed to the selected workstation, a pneumatic cylinder 808 which is affixed to the main structure of the system is actuated, causing a positioning pin 806 to extend into the hole 808, causing the entire wire transport pallet to be positioned accurately in a horizontal direction.

FIG. 15 also provides a good illustration of how the sliding bearing mechanisms, 737 and 739, are positioned between the plate 718 and the link off the chain 719 to provide a mechanism for positioning the entire mechanism horizontally with respect to the chain link, as previously described.

FIG. 16 is a top view of portions of FIG. 15 illustrating the positioning of the indexing mechanism with respect to the vertical plate 718. This view clearly illustrates that the actuating cylinder 808 is affixed to a bracket 818 which is in turn affixed to the structure of the system. Two sensors, 814 and 816, (not illustrated in FIG. 15) are included to detect the two positions of the position pin 806 and couple signals indicative of these positions to the control systems 402 (FIG. 1). More specifically, sensor 816 indicates when the pin is inserted while 814 illustrates when the pin is withdrawn. Thus, by actuating the position pin, the wire holding clamps can be very accurately positioned in a horizontal direction.

The horizontal indexing mechanism illustrated in FIGS. 15 and 16 is also generic in that it can be positioned at any workstation which require this function.

FIG. 17 is a side view of the wire feed and cut workstation 422 which is designed to feed wires in the wire transport pallet 414 described above. More specifically, the wire 900 to be fed to the wire transport pallet 414 is normally stored on a roll, not illustrated. The wire 900 first passes through two pairs of orthogonally positioned straightening rollers, 902 and 904. After passing through the straightening rollers, 902 and 904, the wire 900 passes through a measuring device comprising a wheel 906 having a known diameter and a rotational encoder affixed thereto and a tension wheel 908 which holds the wire 900 against the wheel 906. After passing through the measuring wheels, the wire 900 passes through two drive wheels 910 which rotate to push the wire 900 through two shear blocks, 912 and 914, through the opened clamp 756 through a wire turnaround mechanism 918 and back through the shear blocks, 914 and 912, a second time. The wire turnaround mechanism includes upper and lower sections respectively movable in upward and downward directions. After the wire has been threaded through the shear blocks, 912 and 914, pneumatic cylinder 920 is actuated to lower the bottom portion of the wire turnaround 918. The top plate (section) is provided with suitable mechanisms to move this plate upward. After, top and bottom section of the wire turnaround mechanisms have been lowered and raised as discussed above, one of the wire support clamps is closed to grip the wire while the other wire support clamp 658 is opened. The wire feed drive mechanism 910 is energized to feed the proper length of wire into the wire transport pallet 414. After this has been accomplished, both of the wire wire support clamps, 656 and 658, are closed and pneumatic cylinder 916 is actuated, causing the shear block 912 to move upward, shearing the wire 900 at the intersection of these two blocks. To provide guidance for the wire between the drive mechanisms 910 and the shear block 914, a flexible tube is provided through which the wire 900 travels.

FIG. 18 is a top view of the wire feed and cut workstation 422 and wire turnaround apparatus. In addition to the various components of this system previously discussed with respect to FIG. 17, from the this illustration the curved grooves in the bottom section 928 of the wire turnaround and the overlapping top plate 930 are clearly visible. Additionally, the U-shaped turn in the wire 900 as it is pushed by the feeder rolls 910 through the shear blocks, 912 and 914, as well as through the groove in the wire turnaround apparatus are clearly visible. Additionally, two plungers, 924 and 926, operated by pneumatic cylinders for opening the wire clamps are required in the wire loading operation are illustrated.

Figure 20:
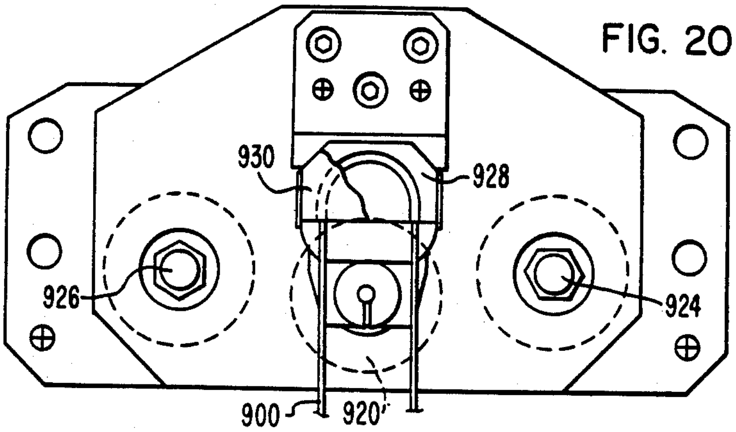
FIG. 20 is a top view of the wire turnaround.
Figure 19:
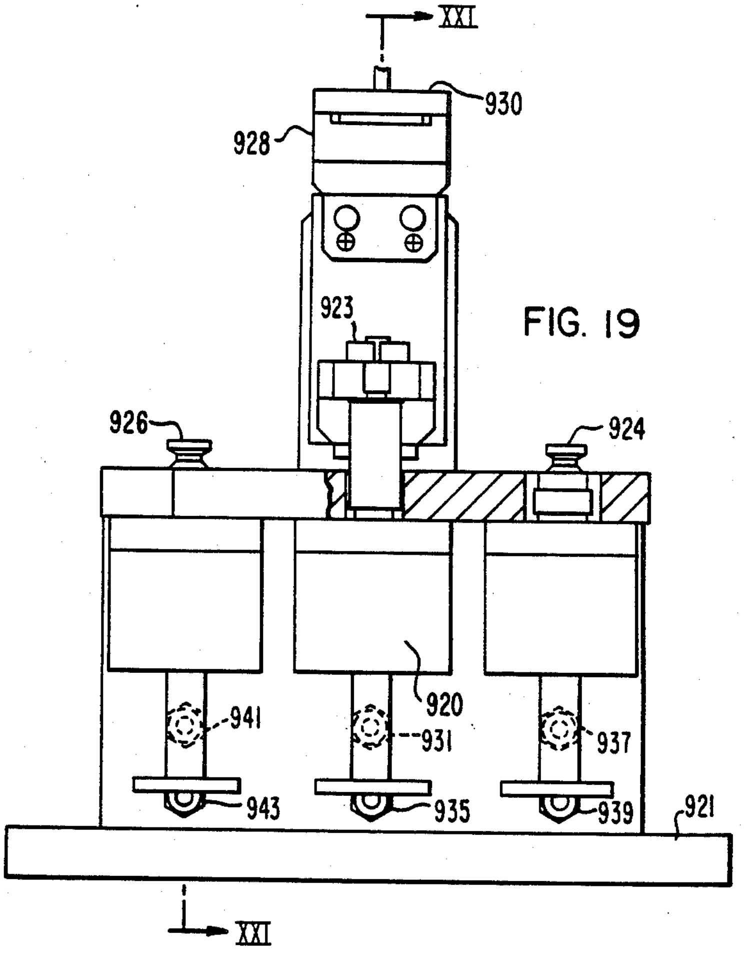
FIG. 19 is a front view of the wire turnaround.

FIGS. 19 and 20 are respectively the front and more detailed top views illustrating the wire turnaround. From these illustrations the turnaround groove in the bottom piece of the wire turnaround apparatus 928 as well as the top plate is also seen. Similarly, in FIG. 19 the pneumatic cylinder 920 which drives the lower half of the wire turnaround up and down as previously discussed is also clearly visible. Sensors, 931 and 935, produce signals indicating the position of the wire turnaround. Similarly, sensors, 941 and 943, generate signals indicating the position of wire clamp opening plunger 926. Sensors, 937 and 939, generate signals indicating the position of wire clamp opening plunger 924. The output signals of these sensors is coupled to the control sytem 402 (FIG. 2) and in response thereto, the control system generates signals to activate the wire feed and cut station 426 and the wire turnaround system as discussed above.

For purposes of explaining the operation of the wire turnaround apparatus, the first step in the wire loading process is to activate the pusher cylinder 673 of FIG. 13 to engage both of the pusher brackets, 666 and 668, illustrated in FIG. 9 to move the wire support clamps, 656 and 658, such that they are directly in front of the front shear block 914 as illustrated in FIG. 17. Pneumatic cylinder 920 is used to raise the lower portion 918 of the wire turnaround into an elevated position, also illustrated in FIG. 17. After the lower portion 918 of the wire turnaround 918 has been raised, the upper portion 918 of the wire turnaround is lowered as illustrated in FIGS. 17 and 18. Clamp opening solenoids, 924 and 926, are then activated to open the wire support clamps, 658 and 660. After positioning of the wire turnaround and wire support clmaps, as described above, the wire drive mechanism 910 illustrated in FIG. 10 is energized to feed the wire 900 through the shear blocks, 912 and 914, around the U-shaped portion of the turnaround and back through shear blocks, 914 and 912. Once this is achieved, the pneumatic cylinder 924 is activated to close the wire clamp 656 as illustrated in FIG. 17, cylinder 920 is utilized to lower the bottom half 928 of the wire turnaround and the top half 930 is lifted using suitable mechanisms. Following this the wire drive mechanism is again actuated to feed additional wire through wire support clamp 658 with the excess being accumulated in the wire container 649 as illustrated in FIG. 5. When a suitable length of wire has been loaded, the second wire support clamp 658 is closed and the rear shear block 912 is moved upward by pneumatic cylinder 916 shearing the wire 900 at the interface of the shear blocks, 912 and 914. The pusher mechanism is then utilized to retract the wire support clamps to their normal position as illustrated in FIG. 6.

Figure 21:
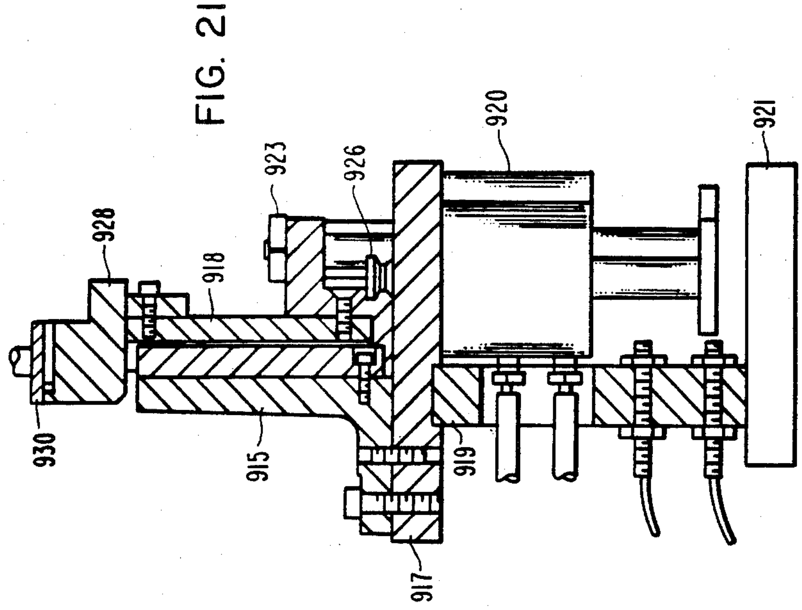
FIG. 21 is a side view of the wire turnaround.

FIG. 21 is a side view of FIG. 19. FIG. 21 is a side view of the wire turn apparatus. From this Figure it is clear that a nut 923 is utilized to secure the piston rod of the pneumatic cylinder 920 to the vertical support member 918 for the lower section 928 of the wire turnaround. Upright member 918 is slidably secured to a second support member 915. This member is ultimately affixed to a plate mechanism 917 utilizing screws. Plate 917 is in turn affixed to a second vertical member 919 which is in turn affixed to the base support mechanism 922. The base support 921 is in turn secured to the support table for the system. Two position sensors indicate whether the wire turnaround is in its raised or lowered position. Two air inlets alternately determine whether the mechanism is in its raised or lowered position.

Figure 22:
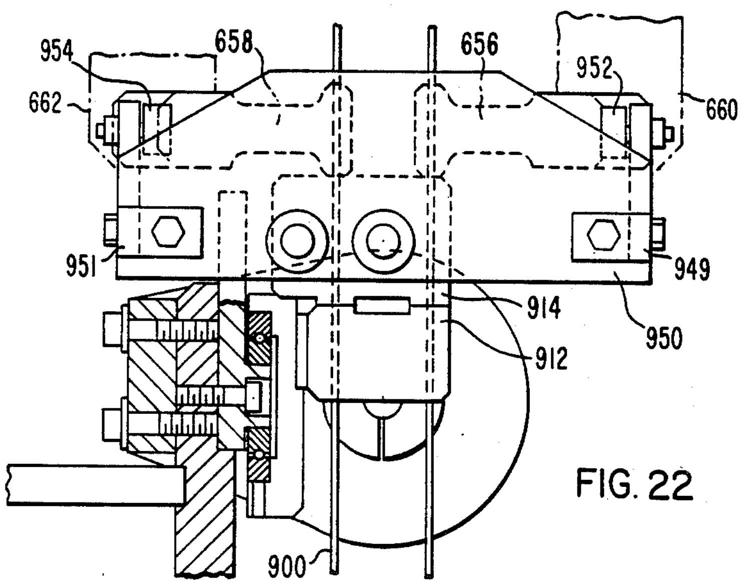
FIG. 22 is a top view of the wire shear.

When the wire holding clamps, 656 and 658, as well as the wire turnaround apparatus is fixed in a position for loading wire into the container as discussed above, it is also desirable that the wire support clamps, 656 and 658, be provided with vertical support, assuring that the wire holding grooves in these clamps precisely line up with the wire openings in the shear block 914. This is accomplished by affixing to the top surface of the front shear block 914 a substantially flat plate 950, illustrated in FIG. 22. Near the edges of this plate are two grooves into which L-shaped brackets, 949 and 951, are affixed. Two rollers, 952 and 954, are affixed to the arms, 949 and 951, such that when the wire support clamps, 656 and 658, are positioned adjacent to the front shear block 914, as they are in the wire loading position, the plates, 660 and 662, to which the wire clamps, 656 and 658, are affixed, rest on the top surface of the rollers, 952 and 954, so as to hold the grooved portions of the wire holding clamps, 656 and 658, substantially aligned with the openings in the shear blocks 914. This permits the wire clamps to be vertically aligned as required for wire loading. Two screws, 953 and 955, are provided to adjust the arm portions, 949 and 951, vertically with respect to the plate 960 to provide precise vertical alignment. The horizontal alignment pin 806 (FIG. 15) is used to provide substantially precise horizontal alignment.

Figure 24:
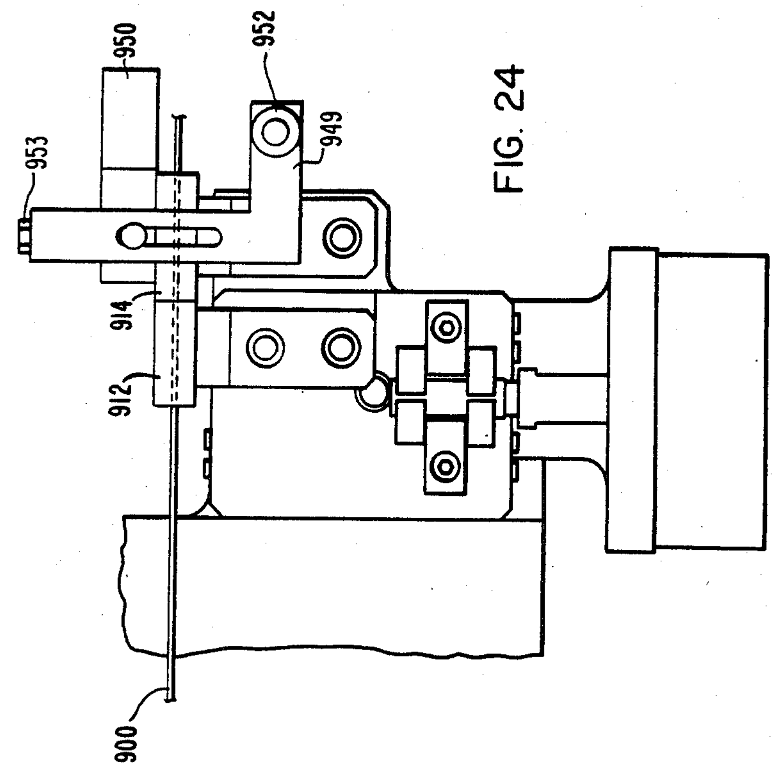
FIG. 24 is a side view of the wire shear.
Figure 23:
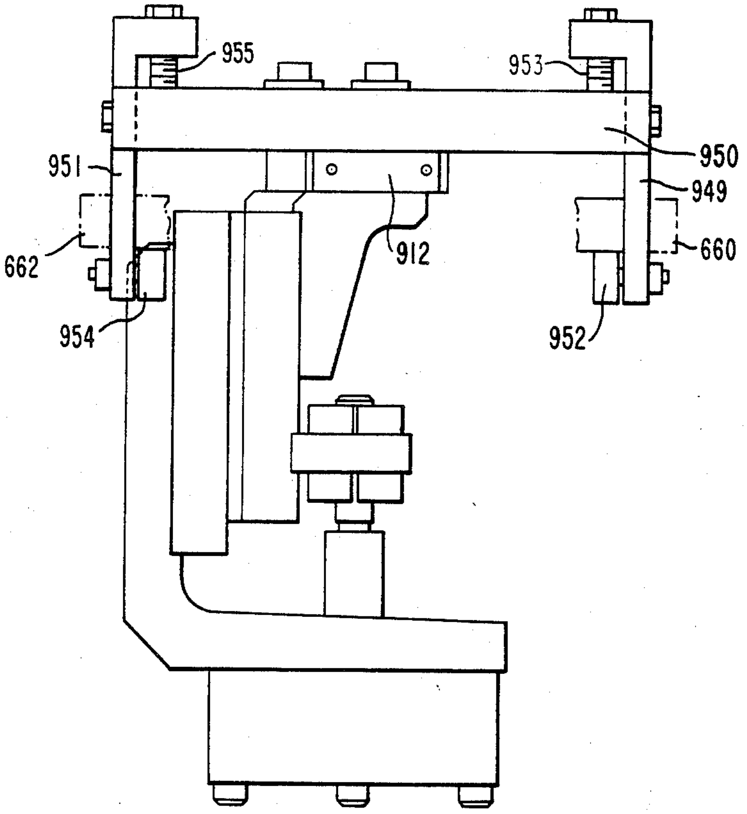
FIG. 23 is a front view of the wire shear.

A side view of FIG. 23 is illustrated in FIG. 24 in order to more precisely show the design of the plate member 950 as well as the arms, 949 and 951.

In the process of loading wire into the wire support clamps, 656 and 658, as previously discussed, the wire turnaround apparatus invariably leaves some bend in the wire end portions, 413 and 415. In the operation of the system, it is highly desirable for the end portions, 413 and 415, of the wires to be supported in the wire support clamps, 656 and 658, such that they extend outwardly from the clamps a known distance and at substantially right angles with respect to the wire clamps. This being the case it is necessary to utilize a wire straightener to straighten the wires after they have been loaded into the wire support clamps, 656 and 658. Apparatus 428 for straightening the wire is illustrated in FIG. 25.

The wire straightener 428 will be discussed with reference to a single lead held in wire support clamps 656. The leads in each of the wire support clamps are straightened separately using an identical process. Therefore, only one will be described.

The first step in straightening a lead is to utilize the push bar 670 to position the wire support clamp 656 in its forward position such that the lead to be straightened is positioned between the jaws 1000 and 1002 of the wire straightener 428. Once positioned within grip of the jaws, a pneumatic cylinder 1014 is utilized to pull a rod 1018 to the position as indicated in FIG. 5. In this position, the flange on the end of the rod 1018 is in grooves of the ends of the jaws 1000 and 1002, causing the front portions of the jaws to close tightly on the wire lead. An electric motor 1010 is coupled to a pulley 1012 which is in turn coupled through pulley 1006 to the shaft portion 1004, causing the jaws of the straightener to rotate. Once the wire is positioned in the jaws of the straightener, the jaws closed and rotated, the pusher bar 670 is released to withdraw the wire support clamp 656 away from the front portions of the straightener jaw 1000 and 1002 and slowly pulls the wire from between the jaws. Once the wire has been fully extracted from the gripper jaws, the straightening operation is completed. However, it should be emphasized that the straightening operation can be repeated for as many cycles as is necessary, depending on the extent to which straightening is required.

Figure 25:
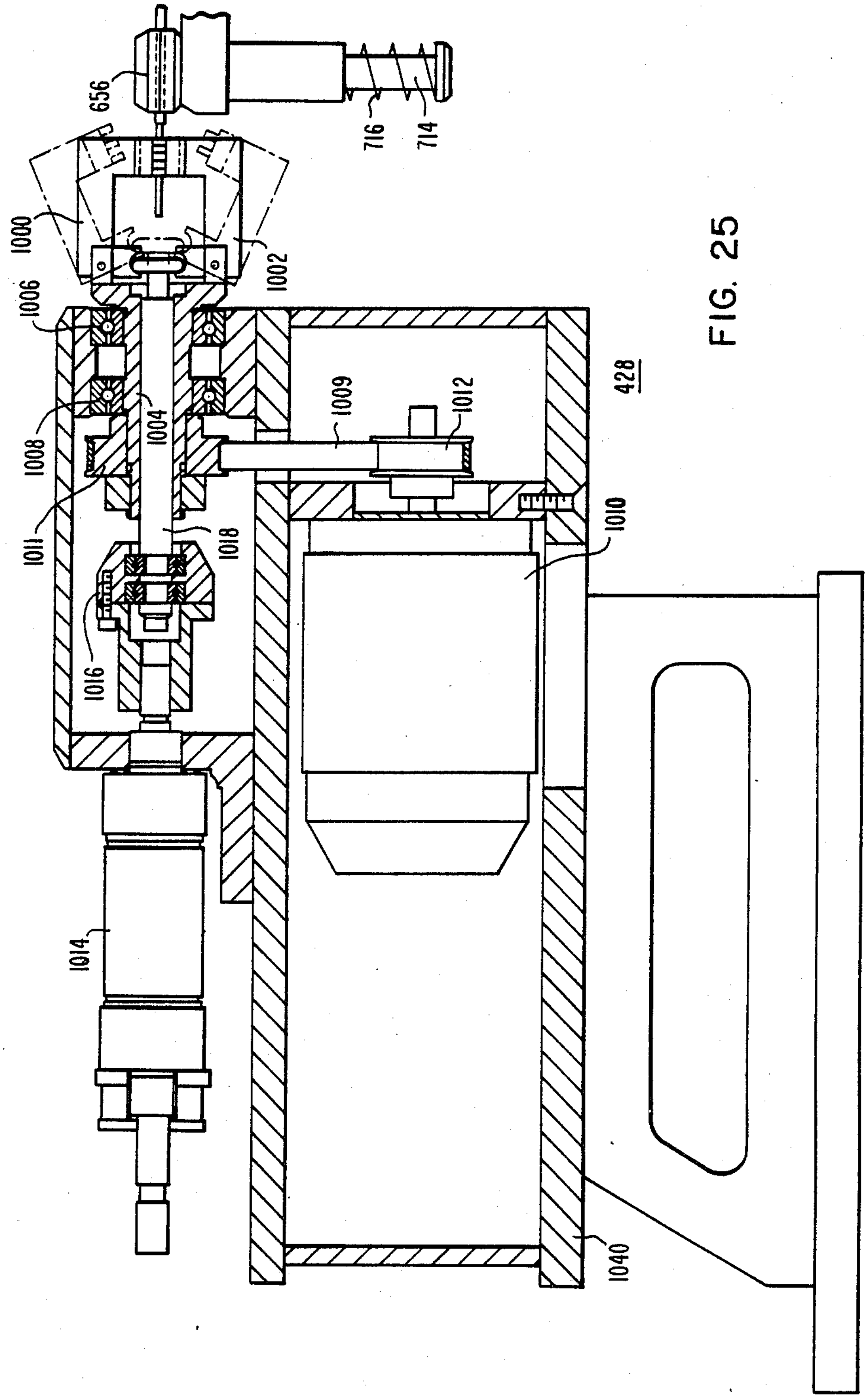
FIG. 25 is a side view of the wire straightener workstation.
Figure 26:
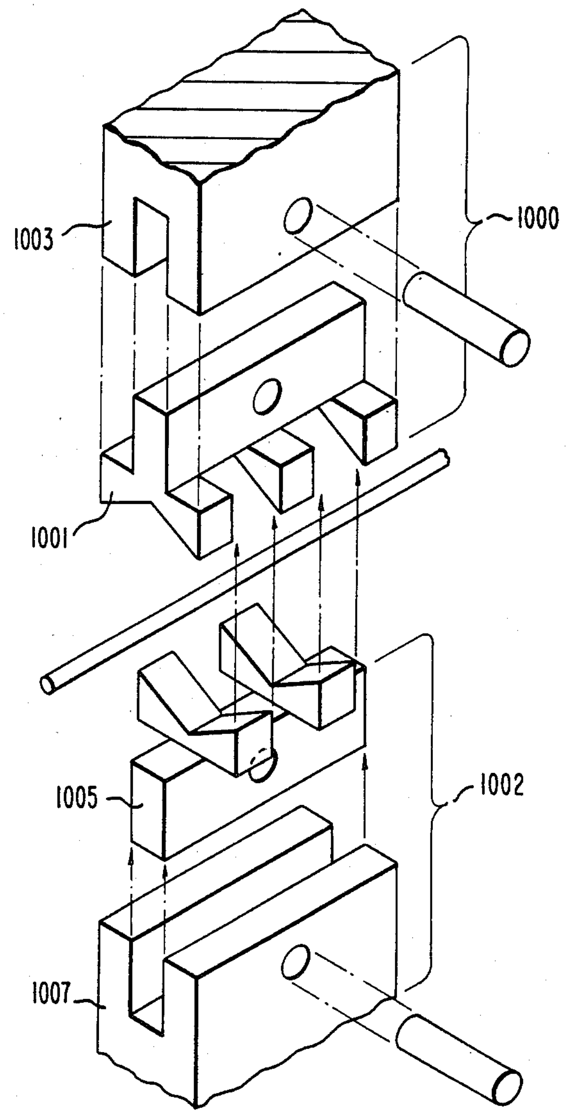
FIG. 26 is an isometric drawing of the wire straightener jaws.

To aid in further understanding of the wire straightener 428 illustrated in FIG. 25, each of the straightener jaws 1000 and 1002 are shown in further detail in FIG. 26. For example, straightener jaw 1000 contains a major support member 1003 partially illustrated in FIG. 26. In the end of this member is a groove for accepting the mating portion of the working head illustrated at reference numeral 1001. The working head 1001 includes a portion for extending into the groove in support member 1003 and is secured therein by a pin. The surface actually contacting the wire during the straightening operation comprises a plurality of substantially rectangular-shaped surfaces with pairs of the surfaces joining to form substantially V-shaped teeth-like structures. The point at which these surfaces join is substantially parallel to the rotational axis of the straightener. The second working head 1005 includes similar complementary surfaces. In operation, the opposed portions 1005 and 1001 of the straightener head form interleaving surfaces which apply opposed forces to alternating segments of the wire to be straightened. The heads are rotated and as the wire is withdrawn, these forces spiral down the surface of the wire, causing the wire to be straightened.

Figure 27:
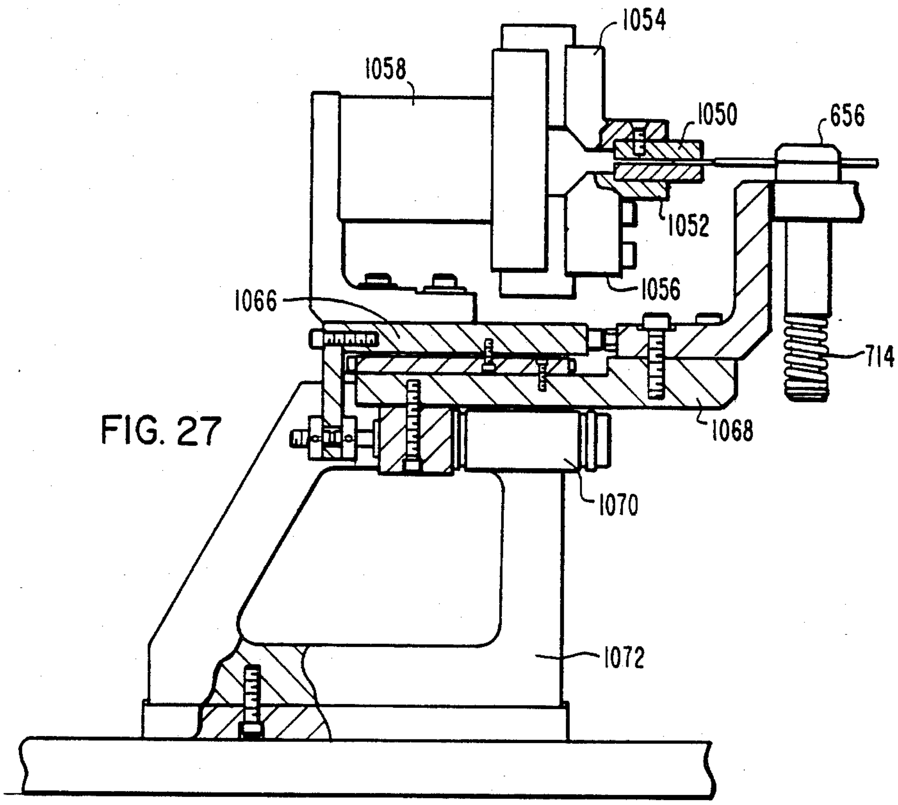
FIG. 27 is a side view of the terminal pull-test workstation.

FIG. 27 is a somewhat schematic diagram of a pull test workstation 470 which is designed to grip the wire and a terminal attached thereto and apply a force between the two to determine if the terminal is properly attached. More specifically, the wire gripper 656 grips the wire and positions it in front of the pull test workstation 470 as illustrated in FIG. 27. The pull test workstation 470 contains two opposed jaws 1050 and 1052 which close on the wire terminal as illustrated in FIG. 27. Each of the jaws 1050 and 1052 are preferably electrically conductive and are electrically insulated from the remaining portions of the system by two insulators 1054 and 1056. The insulators are mounted to a gripper mechanism 1058 which is in turn secured to the rod portion of a pneumatic cylinder 1070 by a bracket 1066.

Air pressure is appropriately applied to the pneumatic cylinder 1066 to apply force to the terminals secured to the wire. Should the terminal not be appropriately crimped, no retraining force will be applied with the pneumatic cylinder 1070 is actuated and the motion will be detected to indicate that the terminal was improperly applied.

Sensors to provide the signals indicating the operating parameters of the pull test are provided to the control system 402 and in response thereto control signals to operate the pull test workstation are provided.

FIG. 28 is a drawing that illustrates generally the workstation for marking the wires. Functionally this is a substantially standard piece of equipment which uses ink spraying techniques to mark the individual leads. The lead to be marked is held in one of the wire clamps, for example wire clamp 656. The free end of the wire is held between the jaws 1078 and 1080 of a gripper forming a part of the marking system. The marking system includes a pneumatic cylinder 1074 for applying tension to the wire so that it is tightly suspended between the jaws of the gripper and the wire clamp 656. In this position, a spray head 1082 is used to print the desired identifying marks on the wire lead.

Sensors included in the marking system 472 provide signals indicating its operating parameters to the controls system 402. Control system 402 generates the signals necessary to operate the marking system 472.

Figure 29:
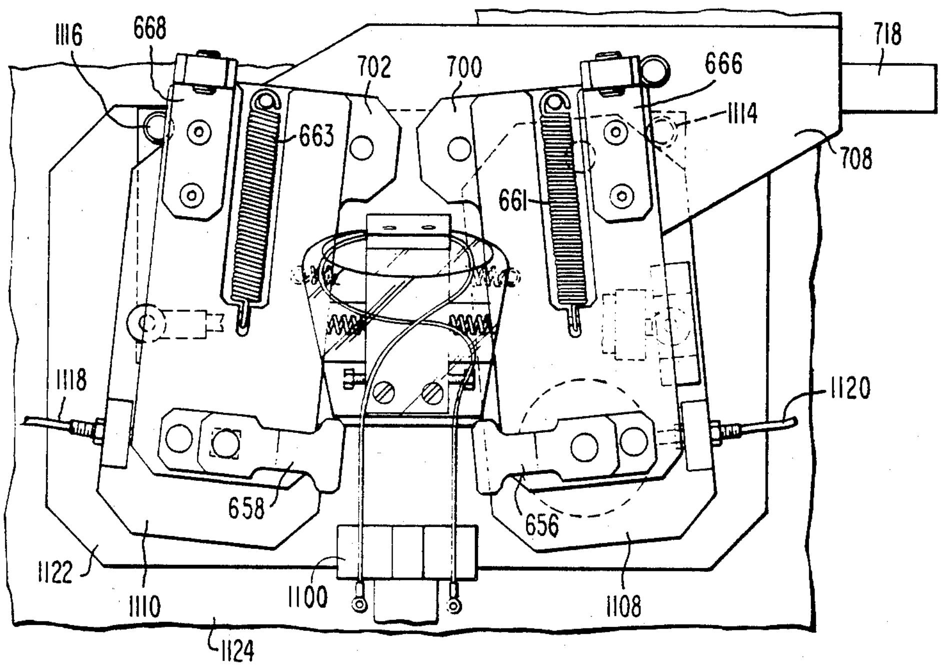
FIG. 29 is a top view of the wire transport pallet with the wire grippers rotated outward and including a portion of the wire unload gripper.
Figure 30:
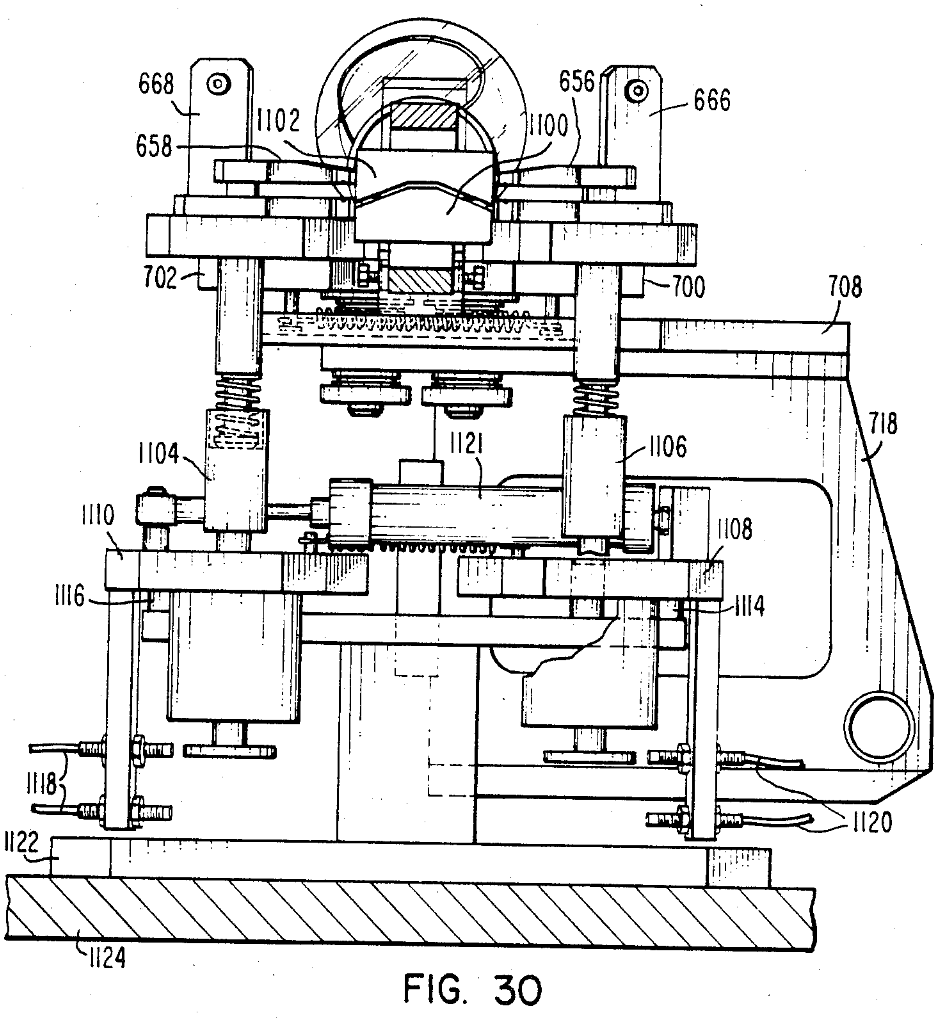
FIG. 30 is a front view of the wire transport pallet illustrating wire unload.

The final operation in the wire preparation system is to remove the finished lead wire from the system and pass it on to the cable harness assembly process. Functionally this is accomplished at the unload station 477 by using a gripper having two jaws, 1100 and 1101, (FIG. 30) to grip the free ends of the lead. After the jaws, 1100 and 1101, are closed on the leads, the wire clamps, 656 and 658, are released and the clamps are rotated outwardly to provide space for removing the wire from the glass container. Functionally this is accomplished by actuating pneumatic cylinders causing the tubular members, 1104 and 1106, as illustrated in FIG. 30 to rise and surround the push rods of the grippers. The springs are compressed, opening the grippers. The actuators are affixed to two plates 1108 and 1110 which are hinged to rotate about pivot points 1114 and 1116 illustrated in FIG. 29. A pneumatic cylinder 1120 is then actuated to rotate the plates 1110 and 1118 about these pivot points, causing the wire grippers, 656 and 658, to be rotated outwardly as illustrated in FIG. 29. Sensors, 1118 and 1120, indicate when the grippers 656 and 658 are open. A similar sensor is utilized to detect when the pneumatic cylinder 1120 has reached its travel limits, indicating that the clamps are positioned in the open position as illustrated in FIG. 29. In this position, an acutator simply pulls the wire from the container by moving the gripper jaws, 1101 and 1100, in a horizontal direction.

FIG. 31 is a more detailed drawing illustrating the container for the wire 1176. This container is affixed to a bracket member 1175 which is in turn spaced from plate member 708 by a block 1178. This positions the container 1176 in the position for receiving the wire.

As previously discussed, each of the wire support pallets 414 are sequentially indexed to each workstation position, including the positions identified as "spare". At each station suitable actuators are provided to operate the wire support pallet 414. It should be emphasized that each of the workstations may not need all of the actuators.

Additionally, the workstations themselves are selected to perform the desired wire preparation function, with the function illustrated being examples only. The workstations themselves can range from essentially prior art apparatus such as the strippers, crimpers and marking systems which have been adapted to accept the wire ends from the wire transport pallets 414 to totally original functions such as the wire straightening workstation 428. Changing the mix or function of the workstation does not change or depart from the concept of the system.

We claim:

1. A system for automatically preparing a section of wire having a predetermined length and with preselected end terminations for use as an electrical connection between spaced apart terminals of an electrical system comprising:

(a) bulk storage means for storing wire exceeding said predetermined length;

(b) means for removing and cutting to said predetermined length wire from said bulk storage means, with the respective wire ends extending in a common generally parallel direction for presentation at a wire preparation workstation means;

(c) wire transport means which receives the removed and cut to predetermined length wire from said bulk storage means, and for transporting the said wire to a wire preparation workstation means, which wire transport means includes first and second wire end support clamps which are independently movable traverse to the direction of travel of said wire transport means;

(d) wire preparation workstation means operative for performing predetermined wire end termination task upon the wire ends presented at said wire preparation workstation means;

(e) control means for controlling operation of said means for removing and cutting said predetermined length wire, and for operating the wire transport means and the wire preparation workstation means to automatically prepare said predetermined length of wire with preselected end termination.

2. A system for automatically preparing a section of wire having a predetermined length and with preselected end termination for use as an electrical connection between spaced apart terminals of an electrical system comprising:

(a) a closed loop transport means comprising an endless chain disposed in a horizontal plane and including operative chain drive means;

(b) a plurality of wire transport pallets which engage the endless chain about periphery of the chain, which transport pallets include first and second wire end support clamps which are slidably mounted on the transport pallet and which are independently slidable transverse relative to the duration of travel of the pallets;

(c) at least one wire storage and wire feeded cutting workstation disposed on the periphery of the closed loop transport means for storing wire exceeding said predetermined length and for cutting said wire to said predetermined length;

(d) a plurality of wire container means which are individually disposable on mid transport pallets with said predetermined length wire disposed within mid container means with wire ends extending in common generally parallel direction from said container means, which wire ends are engageable by said first and second wire end support clamps for presentment of the wire ends to wire end workstation;

(e) a plurality of wire preparation workstation disposed about the closed loop transport means operative for performing predetermined wire end termination tacks upon the wire ends presented thereto;

(f) control means for controlling operation of said wire storage and wire feeded cutting workstation, said plurality of wire preparation workstation, and for coordinating movement of the wire transport pallets about the transport means with operation of the individual wire preparation workstations.

* * * * *